US012280511B1

(12) United States Patent
Pan et al.

(10) Patent No.: US 12,280,511 B1
(45) Date of Patent: Apr. 22, 2025

(54) MULTI-FUNCTIONAL KNIFE

(71) Applicant: NINGBO XINGWEI CUTTING-TOOLS TECHNOLOGY CO., LTD., Ningbo (CN)

(72) Inventors: Mingxiang Pan, Ningbo (CN); Yuancheng Ye, Ningbo (CN)

(73) Assignee: NINGBO XINGWEI CUTTING-TOOLS TECHNOLOGY CO., LTD., Ningbo (CN)

(*) Notice: Subject to any disclaimer, the term of this patent is extended or adjusted under 35 U.S.C. 154(b) by 0 days.

(21) Appl. No.: 18/988,981

(22) Filed: Dec. 20, 2024

(30) Foreign Application Priority Data

Dec. 22, 2023 (CN) ......................... 202311787417.2
Jan. 22, 2024 (CN) ......................... 202410089192.1

(51) Int. Cl.
*B26B 1/08* (2006.01)
*B26B 5/00* (2006.01)

(52) U.S. Cl.
CPC ................ *B26B 1/08* (2013.01); *B26B 5/003* (2013.01); *B26B 5/006* (2013.01)

(58) Field of Classification Search
None
See application file for complete search history.

(56) References Cited

U.S. PATENT DOCUMENTS 6,000,137 A * 12/1999 Gamba ..................... B26B 5/00 30/169
8,707,490 B1 * 4/2014 Pelton ..................... B26B 11/00 30/142
8,739,414 B2 * 6/2014 Tyers ...................... B26B 11/00 30/162
10,589,436 B1 * 3/2020 Panosian ................... B26B 1/08
2022/0362917 A1 * 11/2022 Christian ................. B25G 3/18

FOREIGN PATENT DOCUMENTS

CN 217620706 U 10/2022
CN 118809679 A * 10/2024

OTHER PUBLICATIONS

English translation of CN-118809679-A, dated Oct. 22, 2024.*
English translaton of CN-217620706 U, dated Oct. 21, 2022.*

* cited by examiner

*Primary Examiner* — Hwei-Siu C Payer
(74) *Attorney, Agent, or Firm* — Cooper Legal Group, LLC

(57) ABSTRACT

A multi-functional knife is provided, including: a housing provided with an accommodating cavity and an opening, where the opening is provided at a front end of the housing; a blade holder configured to hold a blade and removably accommodated in the accommodating cavity; a first guide assembly including a first guide rail and a drive member which is drivably connected to a front side of the blade holder to cause the blade holder to move along the first guide rail; and a second guide assembly including a fixed surface and a second guide rail provided on the fixed surface. A rear side of the blade holder is pivotally connected to the second guide rail to cause the blade holder to move along the second guide rail.

12 Claims, 18 Drawing Sheets

MULTI-FUNCTIONAL KNIFE

CROSS REFERENCE TO THE RELATED APPLICATIONS

This application is based upon and claims priority to Chinese Patent Application No. 202311787417.2, filed on Dec. 22, 2023, and Chinese Patent Application No. 202410089192.1, filed on Jan. 22, 2024, the entire contents of which are incorporated herein by reference.

TECHNICAL FIELD

The present disclosure relates to the technical field of knives, and specifically to a multi-functional knife.

BACKGROUND OF THE INVENTION

Knives are mainly divided into cutter knives for lateral cutting and scraper knives for scraping. Cutter knives are tools for arts and handicrafts. Most cutter knives have a pull-out structure, including a plastic handle and a blade. Generally, the cutting edge of the blade is parallel to the axis of the handle or housing, and is mainly used for cutting, for example, paper, cardboard, etc. A scraper knife generally has a blade perpendicular or orthogonal to the axis of the handle, and is used for scraping, for example, paint, glue marks, etc. from a flat surface. Cutter knives and scraper knives are separate manual tools, and usually cannot be used for each other's purposes. A user usually needs to purchase, store, and carry both the two types of separate tools, which is inconvenient to the user.

Existing multi-functional knives can be transformed between a cutter knife and a scraper knife, but have a complicated structure and are inconvenient to operate.

SUMMARY OF THE INVENTION

An objective of the present disclosure is to provide a multi-functional knife, which has a compact structure and can be quickly positioned at multiple angles through the movement of a blade holder on a first guide rail and a second guide rail to serve as a cutter knife or a scraper knife, thereby improving the working efficiency.

Another objective of the present disclosure is to provide a multi-functional knife, which has a simple structure and does not require the use of an additional complicated accessory, and in which a movement trajectory of a blade holder is defined by a first guide rail and a second guide rail on a surface of a housing to allow a blade to be smoothly adjusted to a plurality of positioning positions in a range of 0° to 90°, thereby reducing the production costs.

Another objective of the present disclosure is to provide a multi-functional knife, in which a first guide member and a second guide member on a blade holder are deflected and guided to an appropriate direction to generate a thrust force to push the blade holder in a rotational direction, in order to cause the blade holder to rotate to a preset position, so that a blade can be used longitudinally, transversely, or obliquely for different purposes, thereby expanding the application range of the knife.

Another objective of the present disclosure is to provide a multi-functional knife, in which a drive member is elastically locked to a blade holder by an anti-rotation member to prevent an accidental relative rotation of the blade holder and the drive member, thereby improving the reliability and safety of the knife in use.

Another objective of the present disclosure is to provide a multi-functional knife, in which a blade in a blade holder can be quickly replaced through a blade change button, thereby simplifying the operation.

To achieve the above objectives, the following technical solutions are adopted in the present disclosure. A multi-functional knife is provided, including: a housing, where the housing is provided with an accommodating cavity and an opening, and the opening is provided at a front end of the housing; a blade holder, where the blade holder is configured to hold a blade, and is rotatably mounted in the accommodating cavity; a first guide assembly, where the first guide assembly includes a first guide rail and a drive member, and the drive member is drivably connected to a front side of the blade holder to cause the blade holder to move along the first guide rail; and a second guide assembly, where the second guide assembly includes a fixed surface and a second guide rail provided on the fixed surface, and a rear side of the blade holder is pivotally connected to the second guide rail to cause the blade holder to move along the second guide rail, and when the drive member is longitudinally moved along an axial direction relative to the fixed surface, the blade holder is selectively rotated into or out of the accommodating cavity, so that an orientation of the blade holder is changed to a plurality of positioning angles between a longitudinal position and a transverse position alternately.

In the present disclosure, the blade holder includes a first guide member and a second guide member, where the first guide member and the second guide member are respectively arranged on the front side and the rear side of the blade holder in a staggered manner, the first guide member protrudes from the front side of the blade holder and is pivotally connected to the drive member to drive the blade holder to translate and/or rotate along the first guide rail, and the second guide member protrudes from the rear side of the blade holder and is pivotally connected to the second guide rail to drive the blade holder to translate and/or rotate along the second guide rail, so that a longitudinal driving force applied by the drive member to the first guide member is converted to a force for turning the blade holder to the plurality of positioning angles.

In the present disclosure, the drive member is provided with a driving surface, the driving surface is equipped with or directly serves as a sliding member, and the first guide member is pivotally connected to a front end of the driving surface; and the first guide rail and the second guide rail are each of a linear structure and/or an arc-shaped structure, an extending direction of the first guide rail is at least partially different from an extending direction of the second guide rail, the second guide rail includes a main branch, the main branch extends outward in a direction deviating from the first guide rail so that the blade holder is connected to the fixed surface and the driving surface in at least two partially different directions, and when the blade holder is gradually turned under acting forces from the fixed surface and the driving surface, the blade holder is gradually rotated out of or back into the accommodating cavity through the opening.

Preferably, the housing includes an upper housing and a lower housing, the drive member is located in the accommodating cavity between the upper housing and the blade holder, the upper housing is provided with a push button groove, the push button groove is elongated and extends along the axial direction, the fixed surface is located on an inner surface of the lower housing, and the second guide rail is formed on the inner surface of the lower housing; the second guide rail further includes a straight segment, the main branch and the straight segment are in integral communication with each other, the main branch extends outward in an arc-shaped or bent configuration along a direction deviating from the straight segment, and an extending direction of the straight segment is identical to the extending direction of the first guide rail; when the blade holder moves linearly along the straight segment of the second guide rail and the first guide rail, the blade on the blade holder is in a state of retracting into the accommodating cavity or in a state of extending out of the opening; and when the blade holder turns and moves along the main branch of the second guide rail and the first guide rail, an orientation of the blade on the blade holder is changed to the plurality of positioning angles between the longitudinal position and the transverse position alternately.

Preferably, the multi-functional knife further includes a movement assembly, where the movement assembly includes a push button assembly and a positioning member, the positioning member is arranged between the push button assembly and the drive member, the positioning member includes a positioning slot and the first guide rail, the positioning slot is formed on a surface of the positioning member, the first guide rail is formed on a rear side of the positioning member, the positioning slot is in communication with an outside through the push button groove, a lower end of the push button assembly passes through the push button groove and the positioning slot and is connected to the drive member to push the drive member to move axially along the first guide rail, and the push button assembly is configured to be elastically locked in the positioning slot to lock the blade on the blade holder in the longitudinal position, the transverse position, or a transitional position between the longitudinal position and the transverse position.

Preferably, the multi-functional knife further includes an anti-rotation member, where the anti-rotation member is rotatably connected to the drive member, a first end of the anti-rotation member is movably connected to the push button assembly, a stop portion is arranged on and protrudes from a side of a second end of the anti-rotation member facing the blade holder, a plurality of stopping grooves configured to accommodate the stop portion are provided on the front side of the blade holder, and a rotation of the anti-rotation member under an action of the push button assembly causes the stop portion to be elastically locked in a stopping groove of the plurality of stopping grooves.

Preferably, the housing is provided with an avoidance area, the avoidance area is located at one side or two sides of the front end of the housing, the accommodating cavity is in lateral communication with an outside through the avoidance area, and when the blade holder rotates, the avoidance area allows the blade holder to rotate out of or into the accommodating cavity.

Preferably, the blade holder includes a first frame, a middle frame, and a second frame, the middle frame is elastically connected to the first frame and the second frame, the first guide member protrudes radially outward from the first frame, the second guide member protrudes radially outward from the second frame and is disposed eccentrically relative to the first guide member, and the blade is detachably mounted between the second guide member and the middle frame.

Preferably, the straight segment of the second guide rail overlaps with the first guide rail in a direction perpendicular to the axial direction, and the main branch of the second guide rail extends radially outward in an arc-shaped configuration from a front end of the straight segment, so that the blade holder is moved to a retracted position, a first longitudinal position, a second longitudinal position, a transitional position, and the transverse position along the second guide rail; when the second guide member is located at a starting end of the straight segment of the second guide rail, the blade holder is longitudinally in the retracted position, and the blade is retracted into the accommodating cavity; when the second guide member moves forward along the straight segment of the second guide rail, the blade holder is sequentially in the first longitudinal position where the blade partially extends out of the opening and the second longitudinal position where the blade completely extends out of the opening; when the second guide member moves from the straight segment to the main branch, the blade holder is turned to the transitional position, and the blade is rotated out of the accommodating cavity by a turning angle of substantially 0° to 90° or 90° to 180°, so that the blade enters an oblique state to serve as an oblique scraper knife; and when the second guide member moves to an end of the main branch, the blade holder is rotated to the transverse position, and the blade enters a transverse state to serve as a transverse scraper knife.

BRIEF DESCRIPTION OF THE DRAWINGS

The accompanying drawings are included to provide a further understanding of the disclosure and are incorporated in and constitute a part of this specification. The drawings illustrate exemplary embodiments of the disclosure and, together with the description, serve to explain the principles of the disclosure.

DETAILED DESCRIPTION OF THE INVENTION

Figure 1:
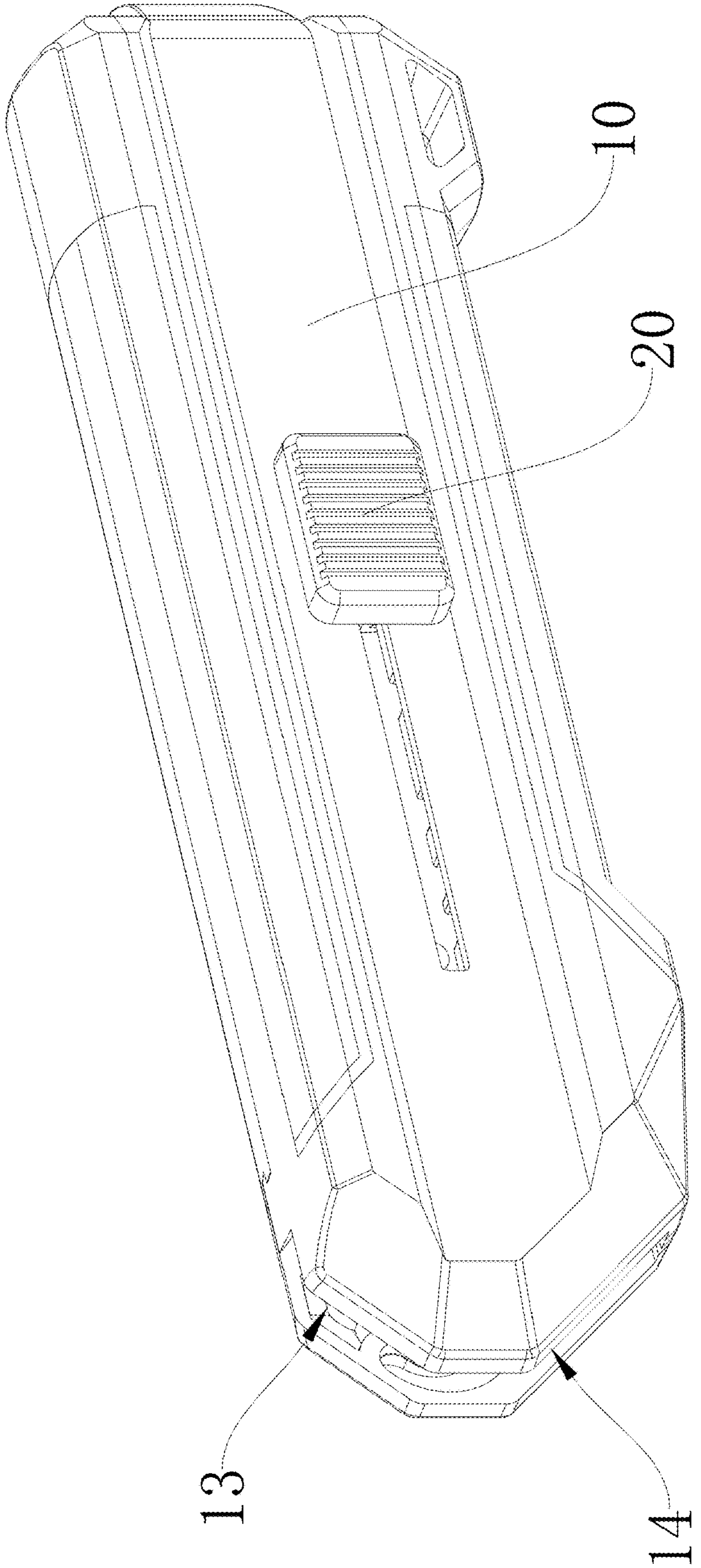
FIG. 1 is a schematic structural diagram of a multi-functional knife in a retracted position according to some embodiments of the present disclosure.

The present disclosure will be further described through specific embodiments. It should be noted that the embodiments or technical features described below may be arbitrarily combined to form new embodiments without conflict.

In the description of the present disclosure, it should be noted that orientation and position relationships indicated by the orientation terms such as “center”, “transverse”, “longitudinal”, “length”, “width”, “thickness”, “on”, “below”, “front”, “rear”, “left”, “right”, “vertical”, “horizontal”, “top”, “bottom”, “inner”, and “outer” are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure.

It should be noted that in the specification and claims of the present disclosure, the terms “first”, “second” or the like are intended to distinguish between similar objects but do not indicate a particular order or sequence.

It should be noted that the terms such as “front side” and “rear side” for indicating the orientation are only for the convenience of describing the present disclosure and simplifying the description, rather than indicating or implying that the apparatus or element described must have a specific orientation or be constructed and operated in a specific orientation, may also be expressed as phrases such as “upper side”, “lower side”, “one side”, and “another side”, and therefore are not to be construed as limiting the present disclosure.

A multi-functional knife is provided. As shown in FIG. 1 to FIG. 11, the multi-functional knife includes a housing 10, a blade holder 30, a first guide assembly, and a second guide assembly. The housing 10 is provided with an accommodating cavity 13 and an opening 14. The opening 14 is provided at a front end of the housing 10 to communicate the accommodating cavity 13 with outside. The blade holder 30 is configured to carry a blade 35. The blade holder 30 is rotatably mounted in the accommodating cavity 13 and is configured to extend out of the accommodating cavity 13 or retract into the accommodating cavity 13 through the opening 14. The first guide assembly includes a first guide rail 222 and a drive member 23, and the drive member 23 is drivably connected to a front side of the blade holder 30 to cause the blade holder 30 to move along the first guide rail 222. In other words, the drive member 23 is pivotally connected to the front side of the blade holder 30, and the drive member 23 moves along the first guide rail 222, and drives the blade holder 30 to move along the first guide rail 222. The second guide assembly includes a fixed surface 122 and a second guide rail 121 provided on the fixed surface 122. A rear side of the blade holder 30 is pivotally connected to the second guide rail 121 to cause the blade holder 30 to move along the second guide rail 121. It can be understood that the blade holder 30 is connected to both the drive member 23 and the second guide rail 121 and can move along the first guide rail 222 and the second guide rail 121, and under the joint guidance of the first guide rail 222 and the second guide rail 121, the blade holder 30 can translate and/or rotate. When the drive member 23 is longitudinally moved along an axial direction relative to the fixed surface 122, the blade holder 30 is selectively rotated into or out of the accommodating cavity 13, so that an orientation of the blade holder 30 is changed to a plurality of positioning angles between a longitudinal position and a transverse position alternately. In other words, through the driving of the blade holder 30 by the drive member 23, the blade holder 30 can translate and/or rotate under guidance of the first guide rail 222 and the second guide rail 121, so that the knife can be quickly positioned at multiple angles to serve as a cutter knife or a scraper knife. The knife is convenient to operate, can improve the working efficiency, and has a compact structure.

Figure 11:
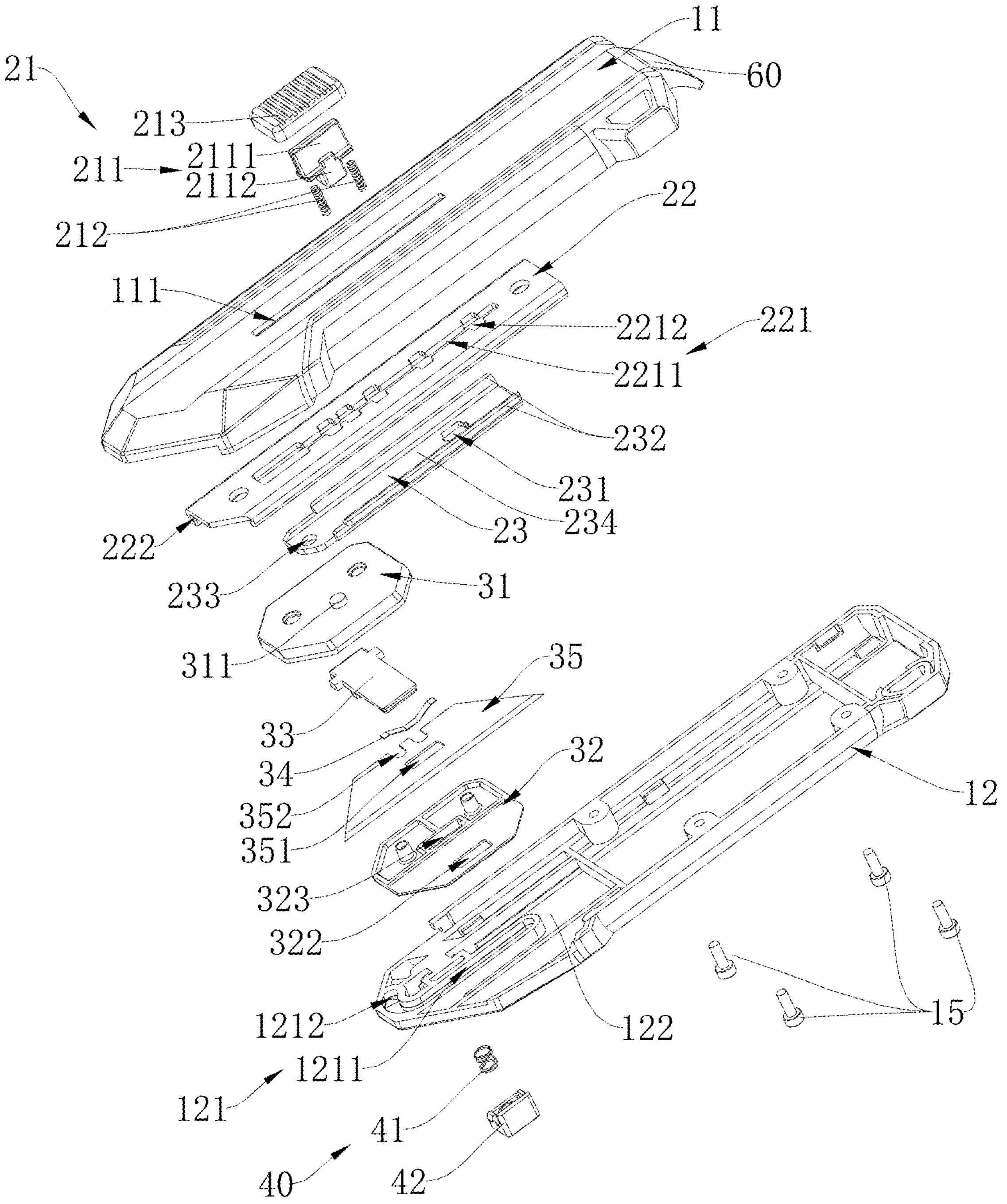
FIG. 11 is an exploded view of a multi-functional knife according to some embodiments of the present disclosure.
Figure 12:
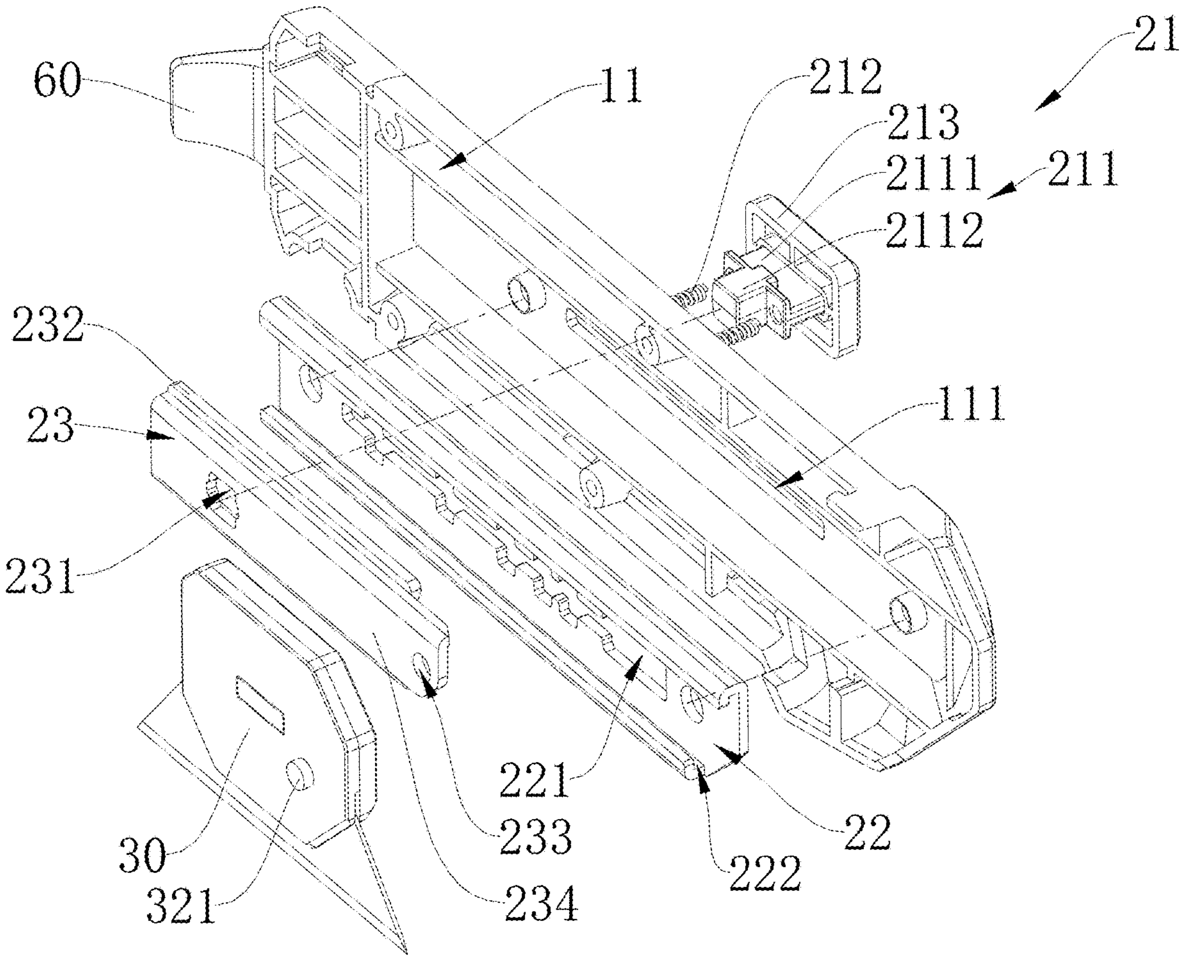
FIG. 12 is a partial exploded view of a multi-functional knife according to some embodiments of the present disclosure.

In some embodiments, as shown in FIG. 11 and FIG. 12, the blade holder 30 includes a first guide member 311 and a second guide member 321. The first guide member 311 and the second guide member 321 are respectively arranged on the front side and the rear side of the blade holder 30 in a staggered manner. The first guide member 311 protrudes from the front side of the blade holder 30 and is pivotally connected to the drive member 23 to drive the blade holder 30 to translate and/or rotate along the first guide rail 222. The second guide member 321 protrudes from the rear side of the blade holder 30 and is pivotally connected to the second guide rail 121 to drive the blade holder 30 to translate and/or rotate along the second guide rail 121, so that a longitudinal driving force applied by the drive member 23 to the first guide member 311 is converted to a force for turning the blade holder 30 to the plurality of positioning angles. In other words, the first guide member 311 is connected to the drive member 23, and further, the first guide member 311 is moved in cooperation with the first guide rail 222 and the second guide member 321 is moved in cooperation with the second guide rail 121 to generate deflection and guidance, to generate a thrust force to push the blade holder 30 in a rotational direction, to cause the blade holder 30 to rotate to a preset position, so that the blade 35 can be used longitudinally, transversely, or obliquely for different purposes, thereby expanding the application range of the knife.

Specifically, as shown in FIG. 1 to FIG. 10, projections of the first guide member 311 and the second guide member 321 on the fixed surface 122 do not overlap. When the first guide member 311 moves along the first guide rail 222 and the second guide member 321 moves along the second guide rail 121, a distance between the projections of the first guide member 311 and the second guide member 321 on the fixed surface 122 remains unchanged. Further, the blade holder 30 can smoothly translate and/or rotate under guidance of the first guide rail 222 and the second guide rail 121, so that the knife can be positioned at multiple angles to realize multiple functions of the knife. The knife is easy to store and carry.

Figure 2:
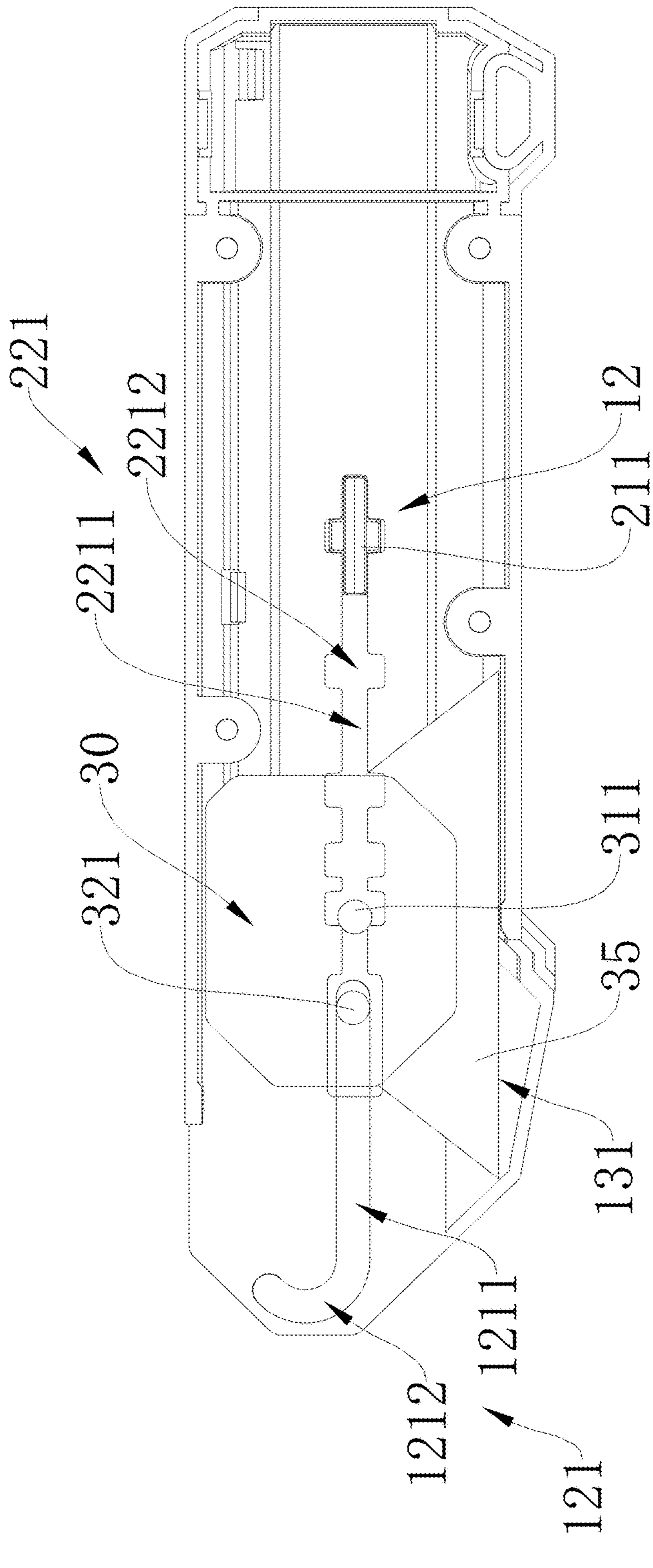
FIG. 2 is a schematic diagram of a multi-functional knife in a retracted position according to some embodiments of the present disclosure.
Figure 3:
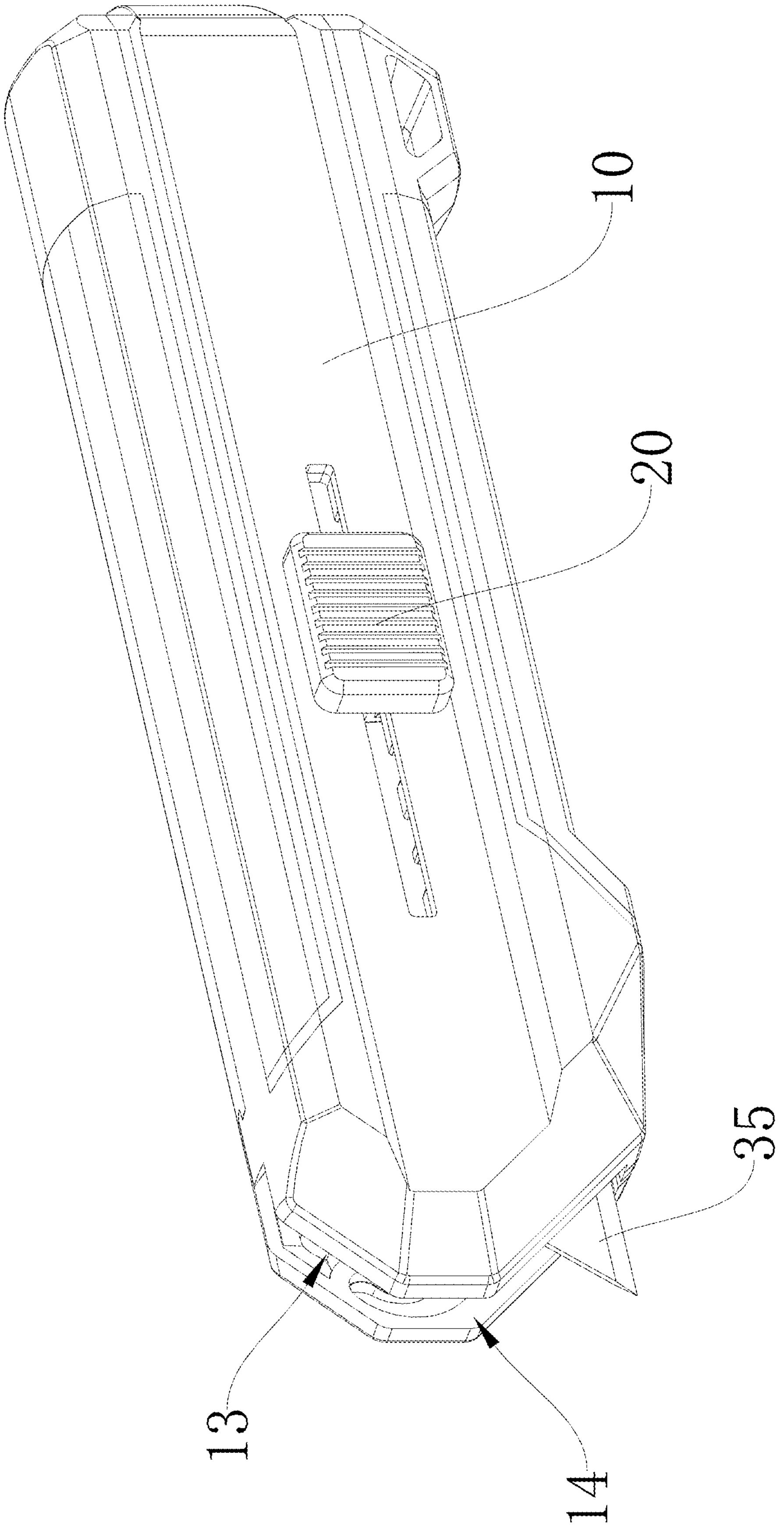
FIG. 3 is a schematic structural diagram of a multi-functional knife in a first longitudinal position according to some embodiments of the present disclosure.
Figure 18:
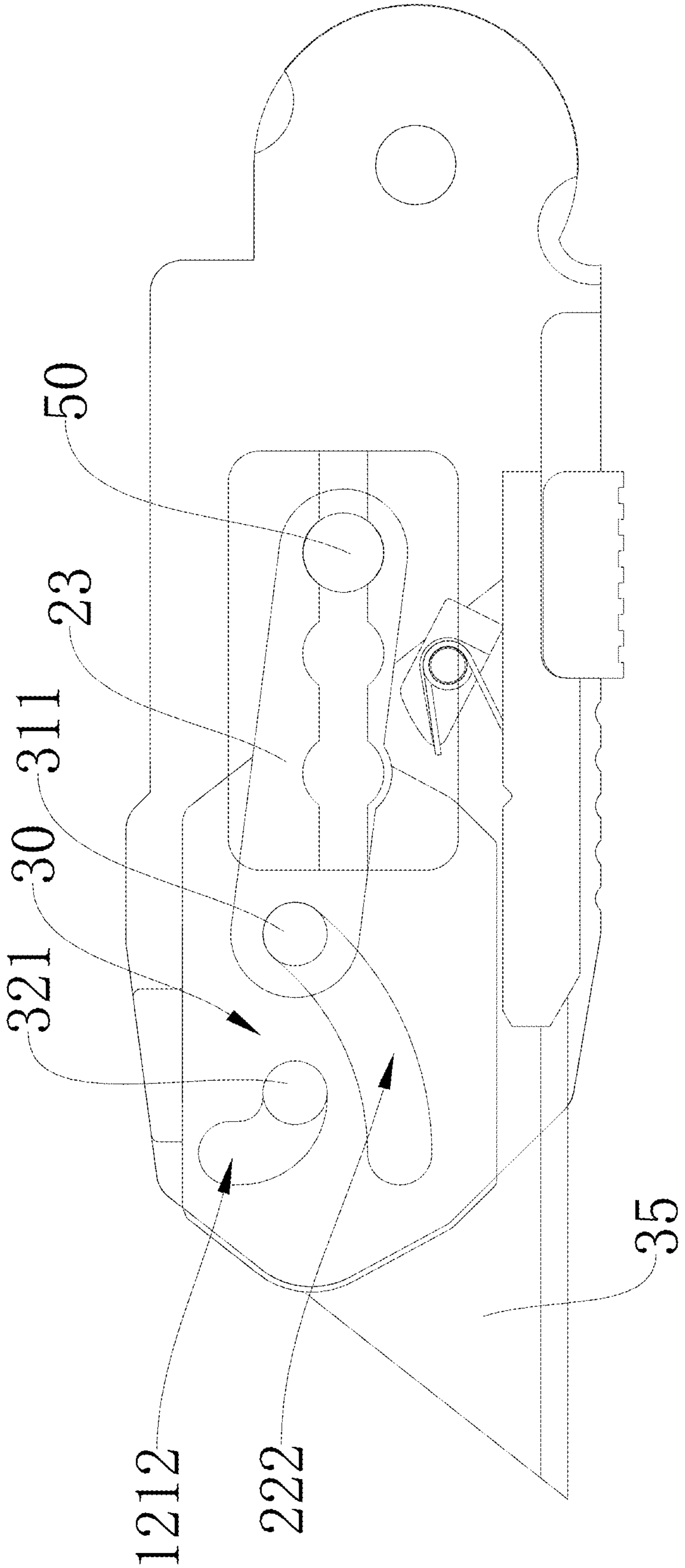
FIG. 18 is a schematic diagram of a multi-functional knife in a retracted position according to some further embodiments of the present disclosure.

In some embodiments, as shown in FIG. 11 and FIG. 12, the drive member 23 is provided with a driving surface 234, the driving surface 234 is equipped with or directly serves as a sliding member 50, and the first guide member 311 is pivotally connected to a front end of the driving surface 234. Specifically, in an optional embodiment, as shown in FIG. 2, when the driving surface 234 directly serves as the sliding member 50, the first guide member 311 on the blade holder 30 is pivotally connected to the front end of the driving surface 234. When moving along the first guide rail 222, the driving surface 234 can drive the first guide member 311 to move along the first guide rail 222, and at the same time, the second guide member 321 moves along the second guide rail 121, to further cause the blade holder 30 to smoothly translate and/or rotate, so that the knife can be positioned at multiple angles. In an optional embodiment, as shown in FIG. 18, when the driving surface 234 is equipped with the sliding member 50, the first guide member 311 on the blade holder 30 is pivotally connected to the front end of the driving surface 234, and the rear end of the driving surface 234 is pivotally connected to the sliding member 50. When longitudinally moving along the axial direction, the sliding member 50 can push the driving surface 234 to translate and/or rotate, and further drive the first guide member 311 to move along the first guide rail 222, and at the same time, the second guide member 321 moves along the second guide rail 121, to cause the blade holder 30 to smoothly translate and/or rotate, so that the knife can be positioned at multiple angles. It can be understood that the first guide member 311 may be connected to the drive member 23, and the drive member 23 moves along the first guide rail 222, so that the first guide member 311 indirectly moves along the first guide rail 222; or the first guide member 311 may be directly engaged with the first guide rail 222, and driven by the drive member 23 to move along the first guide rail 222.

In some embodiments, as shown in FIG. 1 to FIG. 10, the first guide rail 222 and the second guide rail 121 are each of a linear structure and/or an arc-shaped structure, an extending direction of the first guide rail 222 is at least partially different from an extending direction of the second guide rail 121, the second guide rail 121 includes a main branch 1212, the main branch 1212 extends outward in a direction deviating from the first guide rail 222 so that the blade holder 30 is connected to the fixed surface 122 and the driving surface 234 in at least two partially different directions, and when the blade holder 30 is gradually turned under acting forces from the fixed surface 122 and the driving surface 234, the blade holder 30 is gradually rotated out of or back into the accommodating cavity 13 through the opening 14. In other words, when the first guide member 311 moves along the first guide rail 222 and the second guide member 321 moves along the main branch 1212 of the second guide rail 121, the distance between the projections of the first guide member 311 and the second guide member 321 on the fixed surface 122 remains unchanged, and an extending direction of the main branch 1212 deviates from the extending direction of the first guide rail 222, so that the blade holder 30 is turned under the acting forces from the fixed surface 122 and the driving surface 234. For example, the blade holder 30 is rotated out of the accommodating cavity 13 through the opening 14, so that a blade edge is perpendicular to the axis, and the knife serves as a scraper knife; or the blade holder 30 is rotated back into the accommodating cavity 13 through the opening 14, so that the blade edge is parallel to the axis, and the knife serves as a cutter knife; or the blade holder 30 is rotated so that the blade edge forms other angles with the axis. As such, the knife can be positioned at multiple angles to realize multiple functions.

Specifically, as shown in FIG. 1 to FIG. 10, the second guide rail 121 includes a straight segment 1211, the main branch 1212 and the straight segment 1211 are in integral communication with each other, the main branch 1212 extends outward in an arc-shaped or bent configuration along a direction deviating from the straight segment 1211, and an extending direction of the straight segment 1211 is identical to the extending direction of the first guide rail 222. When the blade holder 30 moves linearly along the straight segment 1211 of the second guide rail 121 and the first guide rail 222, the blade 35 on the blade holder 30 is in a state of retracting into the accommodating cavity 13 or in a state of extending out of the opening 14. When the blade holder 30 turns and moves along the main branch 1212 of the second guide rail 121 and the first guide rail 222, an orientation of the blade 35 on the blade holder 30 is changed to the plurality of positioning angles between the longitudinal position and the transverse position alternately. The blade edge of the blade 35 in the longitudinal position is parallel to the axial direction. The blade edge of the blade 35 in the transverse position is perpendicular to the axial direction.

In other words, when the first guide member 311 on the blade holder 30 moves along the first guide rail 222 and the second guide member 321 is located at the straight segment 1211 of the second guide rail 121, the blade edge is parallel to the axial direction, and the blade holder 30 longitudinally translates along the axial direction, so that the blade edge extends out of or retracts into the accommodating cavity 13 through the opening 14; when the first guide member 311 on the blade holder 30 moves along the first guide rail 222 and the second guide member 321 is located at the main branch 1212 of the second guide rail 121, the blade holder 30 can move and turn to change an angle between the blade edge and the axis, so that the knife can be positioned at multiple angles to meet various usage requirements.

In another optional embodiment, as shown in FIG. 18, the first guide rail 222 extends in an arc-shaped configuration, and the main branch 1212 of the second guide rail 121 extends in an arc-shaped configuration in a direction deviating from the first guide rail 222. When the blade holder 30 moves along the first guide rail 222 and the main branch 1212 of the second guide rail 121, the orientation of the blade 35 on the blade holder 30 can be changed to the plurality of positioning angles between the longitudinal position and the transverse position.

In some embodiments, as shown in FIG. 11, the housing 10 includes an upper housing 11 and a lower housing 12. The upper housing 11 and the lower housing 12 are mounted and fixed by a fastener 15. The drive member 23 is located in the accommodating cavity 13 between the upper housing 11 and the lower housing 12 and is arranged between the upper housing 11 and the blade holder 30. The upper housing 11 is provided with a push button groove 111 which is elongated and extends along the axial direction. The fixed surface 122 is located on an inner surface of the lower housing 12. The second guide rail 121 is formed on the inner surface of the lower housing 12 and is pivotally connected to the second guide member 321 on the blade holder 30.

In some embodiments, as shown in FIG. 11 and FIG. 12, the multi-functional knife further includes a movement assembly 20. The movement assembly 20 includes a push button assembly 21 and a positioning member 22. The positioning member 22 is arranged between the push button assembly 21 and the drive member 23. The positioning member 22 includes the first guide rail 222 and a positioning slot 221. The first guide rail 222 is formed on a rear side of the positioning member 22, and is connected to the drive member 23 to further drive, through the drive member 23, the first guide member 311 to move along the first guide rail 222. The positioning slot 221 is formed on a surface of the positioning member 22. The positioning slot 221 is in communication with outside through the push button groove 111 on the upper housing 11. A lower end of the push button assembly 21 passes through the push button groove 111 and the positioning slot 221 and is connected to the drive member 23 to push the drive member 23 to move axially along the first guide rail 222. The push button assembly 21 is configured to be elastically locked in the positioning slot 221 to lock the blade 35 on the blade holder 30 in the longitudinal position, the transverse position, or a transitional position between the longitudinal position and the transverse position.

In other words, the positioning member 22 is fixedly arranged on the upper housing 11, and the rear side of the positioning member 22 is provided with the first guide rail 222 to engage with engaging portions 232 protruding from two sides of the drive member 23, to allow the drive member 23 to move along the first guide rail 222. Further, the first guide member 311 on the blade holder 30 is pivotally connected to a first connecting hole 233 at a front end of the drive member 23, to allow the first guide member 311 to move along the first guide rail 222. The inner surface of the lower housing 12 is provided with the second guide rail 121 to be connected to the second guide member 321 on the blade holder. The lower end of the push button assembly 21 passes through the push button groove 111 on the upper housing 11 and the positioning slot 221 on the positioning member 22, and is connected to a rear end of the drive member 23. The push button assembly can push the drive member 23 to move and further cause the blade holder 30 to translate and/or rotate. Further, the push button assembly 21 is configured to be elastically locked in the positioning slot 221 to lock the blade holder 30 in a target position, so that the blade 35 is located in the longitudinal position, the transverse position, or other target positions between the longitudinal position and the transverse position, for example, form an angle of 30°, 45°, or 60° with the axis. The movement trajectory of the blade holder 30 is jointly defined by the first guide rail 222 on the rear side of the positioning member 22 and the second guide rail 121 on the surface of the housing 10, so that the blade 35 can be smoothly adjusted to a plurality of positioning positions without requiring the use of an additional complicated accessory, thereby reducing the production costs. In an optional embodiment, the positioning member 22 and the upper housing 11 are integrally formed.

In some embodiments, as shown in FIG. 11 and FIG. 12, the push button assembly 21 includes a push button support 211 and a push button spring 212. The push button support 211 passes through the push button groove 111 and the positioning slot 221 and is connected to the drive member 23. A first end of the push button spring 212 presses against the push button support 211, and a second end of the push button spring 212 presses against the drive member 23, so that the push button support 211 is movably locked in the positioning slot 221. A push button panel 213 is fixedly connected to an end of the push button support 211 extending out of an outer side of the upper housing 11 of the housing, to push the push button support 211 to cause the drive member 23 to move along the first guide rail 222.

Further, the push button support 211 includes a first connecting segment 2111 and a second connecting segment 2112 distributed perpendicularly to the driving surface 234. The positioning slot 221 includes a movement region 2211 and a plurality of positioning regions 2212, and the movement region 2211 is elongated and extends along the axial direction, and the plurality of positioning regions 2212 are distributed at intervals. The first connecting segment 2111 passes through the push button groove 111 on the upper housing 11 and is configured to move along the movement region 2211 of the positioning slot 221. The second connecting segment 2112 is connected to a second connecting hole 231 on the drive member 23, and is configured to engage with a positioning region 2212 of the positioning regions 2212 to lock the drive member 23, so that the blade holder 30 is retained in the corresponding target position. In other words, the first connecting segment 2111 of the push button support 211 is configured to move along the push button groove 111 on the upper housing 11, and the first connecting segment 2111 is also configured to move along the positioning slot 221 on the positioning member 22. The second connecting segment 2112 of the push button support 211 is configured to engage with a positioning region 2212 of the positioning regions 2212 of the positioning slot 221 to position the blade holder 30 and thus position the blade 35.

Specifically, the push button assembly 21 is pressed and pushed to compress the push button spring 212, so that the push button support 211 moves inward, the second connecting segment 2112 of the push button support 211 is separated from the positioning region 2212 of the positioning slot 221 of the positioning member 22, and the first connecting segment 2111 is engaged with the movement region 2211. As such, the push button assembly 21 can drive the drive member 23 to move. Then, the push button assembly 21 is released. The push button spring 212 causes the push button support 211 to move outward, and the second connecting segment 2112 of the push button support 211 is engaged with a positioning region 2212 of the positioning regions 2212 to lock the drive member 23 and thus position the blade holder 30. The position of the blade holder 30 can be changed and locked by one-handed operation, thereby improving the convenience and safety of operation. In addition, with the arrangement of the first guide rail 222 and the second guide rail 121, the blade holder 30 can be smoothly moved and turned, and the push button assembly 21 can be pressed and pushed more easily and smoothly.

Figure 13:
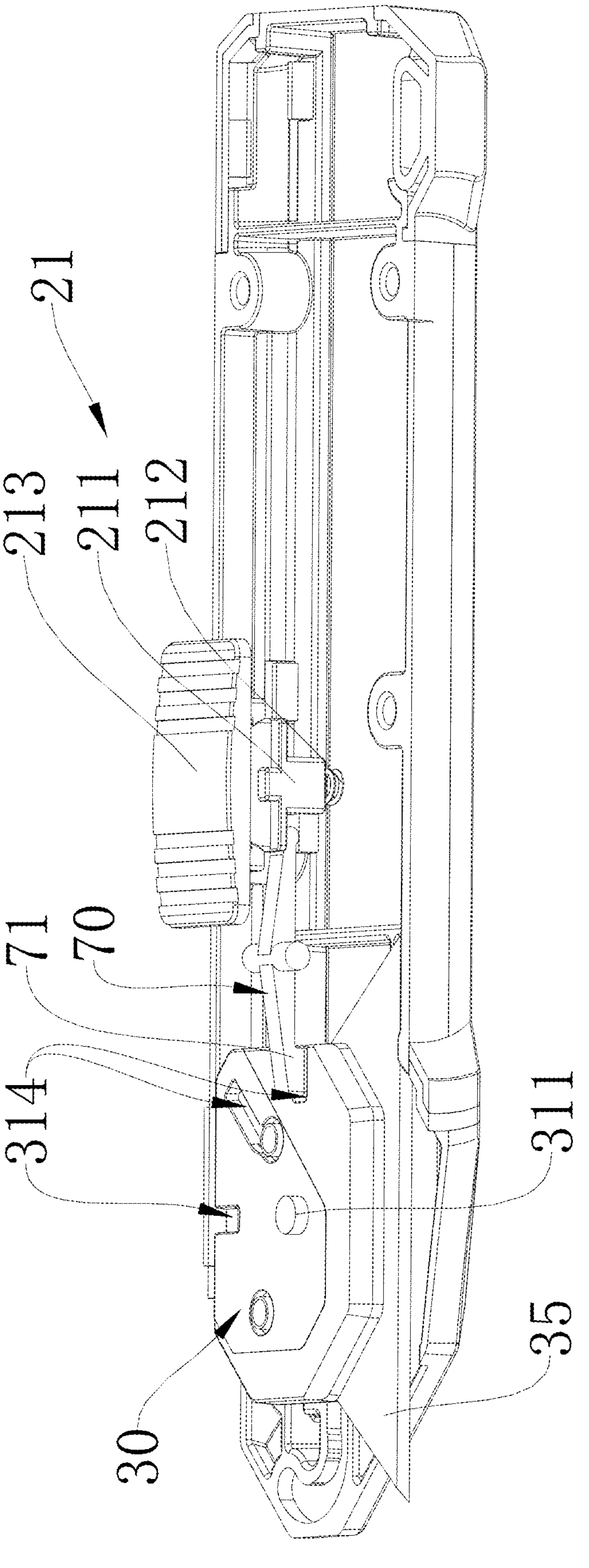
FIG. 13 is a structural diagram of an interior of a multi-functional knife according to some embodiments of the present disclosure.
Figure 14:
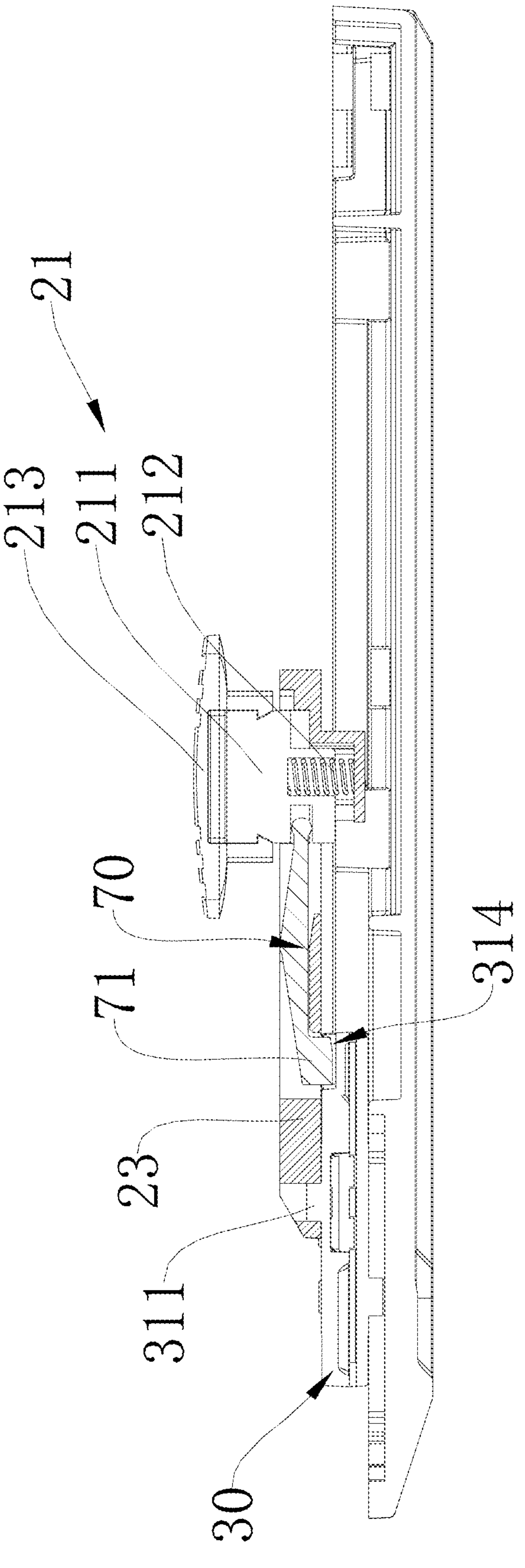
FIG. 14 is a cross-sectional view showing that a stop portion of an anti-rotation member is engaged with a blade holder according to some embodiments of the present disclosure.
Figure 15:
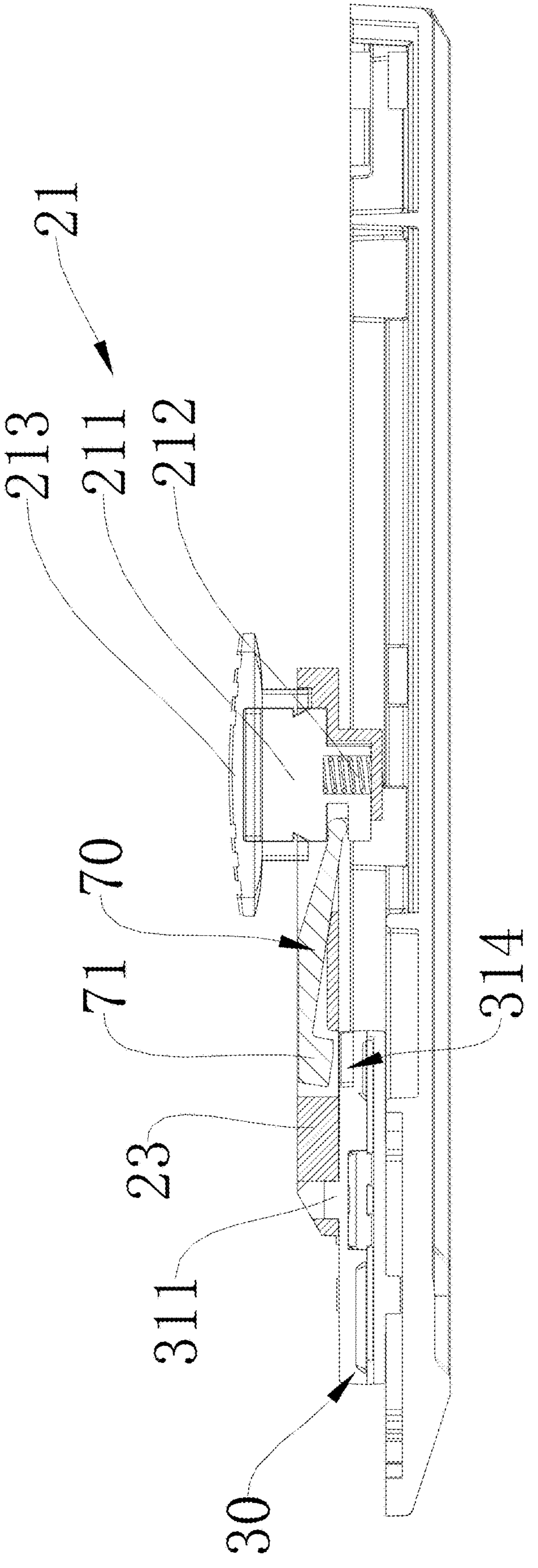
FIG. 15 is a cross-sectional view showing that a stop portion of an anti-rotation member is disengaged from a blade holder according to some embodiments of the present disclosure.

Further, as shown in FIG. 13 to FIG. 15, the multi-functional knife further includes an anti-rotation member 70. The anti-rotation member 70 is rotatably connected to the drive member 23 and can longitudinally move along the axial direction together with the drive member 23. A first end of the anti-rotation member 70 is movably connected to the push button assembly 21. When the push button assembly 21 moves toward an inner or outer side of the housing 10 in a direction perpendicular to the fixed surface 122, the anti-rotation member 70 is driven to rotate relative to the drive member 23. A stop portion 71 is arranged on and protrudes from a side of a second end of the anti-rotation member 70 facing the blade holder 30. A plurality of stopping grooves 314 configured to accommodate the stop portion 71 are provided on the front side of the blade holder 30. When the anti-rotation member 70 is rotated under the action of the push button assembly 21, the stop portion 71 can be engaged with or disengaged from a stopping groove 314 of the stopping grooves 314. It can be understood that when the push button assembly 21 is pressed, the push button assembly 21 moves toward the inner side of the housing 10 to drive the anti-rotation member 70 to rotate, so that the stop portion 71 is separated from the stopping groove 314, and the blade holder 30 can rotate relative to the drive member 23. When the push button assembly 21 is released, the push button assembly 21 moves toward the outer side of the housing 10 to drive the anti-rotation member 70 to rotate, so that the stop portion 71 is engaged with the stopping groove 314, and the blade holder 30 is locked with the drive member 23. In this way, the blade holder 30 is retained in the longitudinal position, the transverse position, or other target positions between the longitudinal position and the transverse position. In other words, through the joint effect of the engagement of the push button assembly 21 with the positioning slot 221 and the engagement of the anti-rotation member 70 with the blade holder 30, the position of the blade holder 30 can be locked, thereby improving the reliability and safety of the multi-functional knife during use. In another optional embodiment, an anti-rotation spring is arranged below a side of the anti-rotation member 70 close to the push button assembly 21 to provide a torque for the anti-rotation member 70, so that the stop portion 71 on the other side of the anti-rotation member 70 moves downward to engage with the stopping groove 314.

In some embodiments, as shown in FIG. 1 to FIG. 10, the straight segment 1211 of the second guide rail 121 overlaps with the first guide rail 222 in a direction perpendicular to the axial direction, and the main branch 1212 extends radially outward in an arc-shaped configuration from a front end of the straight segment 1211. When the drive member 23 moves along the first guide rail 222, the blade holder 30 can be moved to a retracted position, a first longitudinal position, a second longitudinal position, a transitional position, and the transverse position along the second guide rail 121. When the second guide member 321 is located at a starting end of the straight segment 1211 of the second guide rail 121, the blade holder 30 is longitudinally in the retracted position, and the blade 35 is retracted into the accommodating cavity 13. When the second guide member 321 moves forward along the straight segment 1211 of the second guide rail 121, the blade holder 30 is sequentially in the first longitudinal position where the blade 35 partially extends out of the opening 14 and the second longitudinal position where the blade 35 completely extends out of the opening 14. When the second guide member 321 moves from the straight segment 1211 to the main branch 1212, the blade holder 30 is turned to the transitional position, and the blade 35 is rotated out of the accommodating cavity 13 by a turning angle of substantially 0° to 90° or 90° to 180°, so that the blade 35 enters an oblique state to serve as an oblique scraper knife. When the second guide member 321 moves to an end of the main branch 1212, the blade holder 30 is rotated to the transverse position, and the blade 35 enters a transverse state to serve as a transverse scraper knife.

Specifically, as shown in FIG. 2, the blade holder 30 is longitudinally in the retracted position, and the second connecting segment 2112 of the push button support 211 is located in the rightmost positioning region 2212 of the positioning member 22. In this case, the drive member 23 is located on the rightmost side, the first guide member 311 of the blade holder 30 is connected to the first connecting hole 233 at the front end of the drive member 23, the second guide member 321 of the blade holder 30 is located in a right part of the straight segment 1211 of the second guide rail 121, and the blade 35 is completely accommodated in the accommodating cavity 13.

Figure 4:
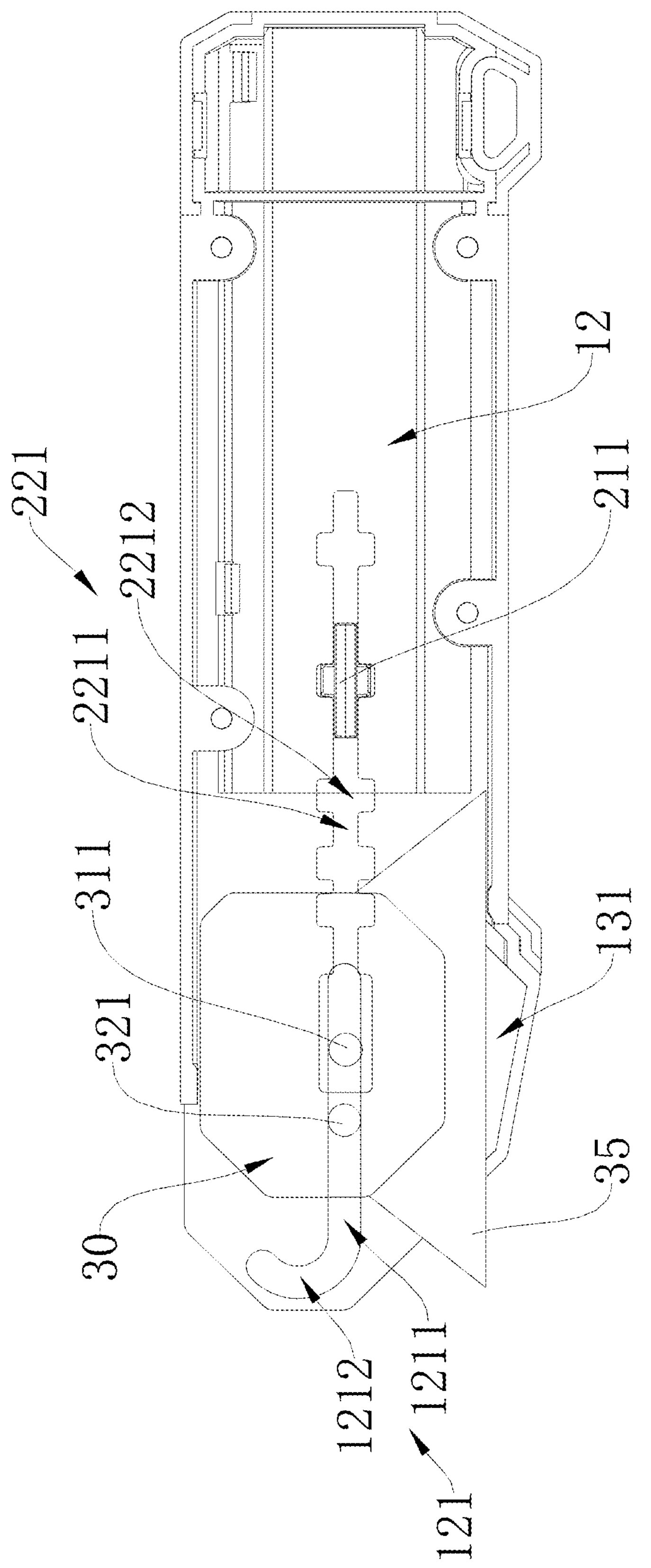
FIG. 4 is a schematic diagram of a multi-functional knife in a first longitudinal position according to some embodiments of the present disclosure.

As shown in FIG. 4, the push button assembly 21 is pressed, so that the second connecting segment 2112 of the push button support 211 is separated from the positioning region 2212 of the positioning slot 221 of the positioning member 22, and the first connecting segment 2111 is engaged with the movement region 2211. As such, the push button assembly 21 can drive the drive member 23 to move forward along the first guide rail 222. The first guide member 311 of the blade holder 30 is connected to the first connecting hole 233 and also moves forward along the first guide rail 222, and the second guide member 321 of the blade holder 30 moves forward along the axial direction to a middle part of the straight segment 1211 of the second guide rail 121, so that the blade holder 30 moves forward along the axial direction to the first longitudinal position. Then, the push button assembly 21 is released. The push button spring 212 causes the push button support 211 to move outward, the second connecting segment 2112 of the push button support 211 is engaged with the positioning region 2212 which is the second from the right, so that the blade holder 30 is locked in the first longitudinal position, and a part of a triangular tip of an end of the blade 35 is exposed out of the housing 10 for use as a cutter knife.

Figure 6:
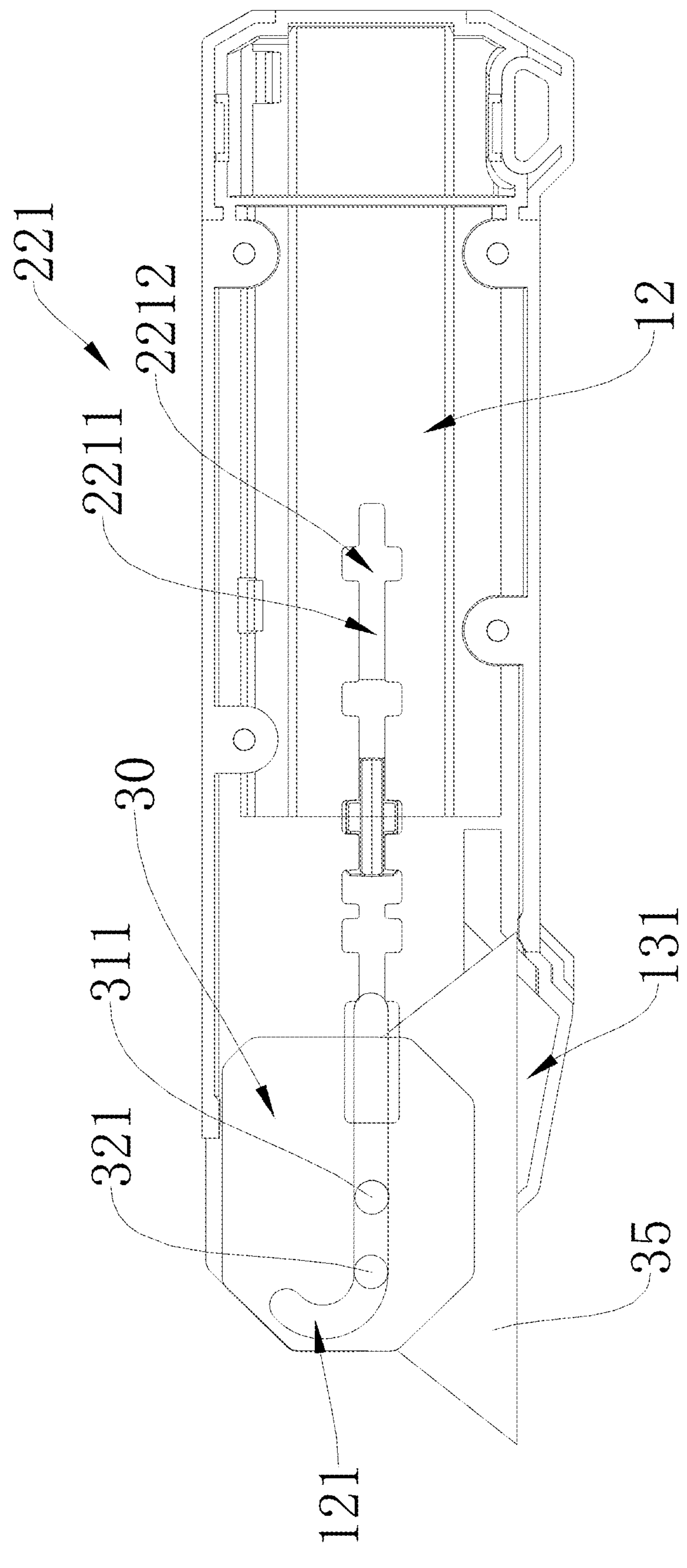
FIG. 6 is a schematic diagram of a multi-functional knife in a second longitudinal position according to some embodiments of the present disclosure.
Figure 7:
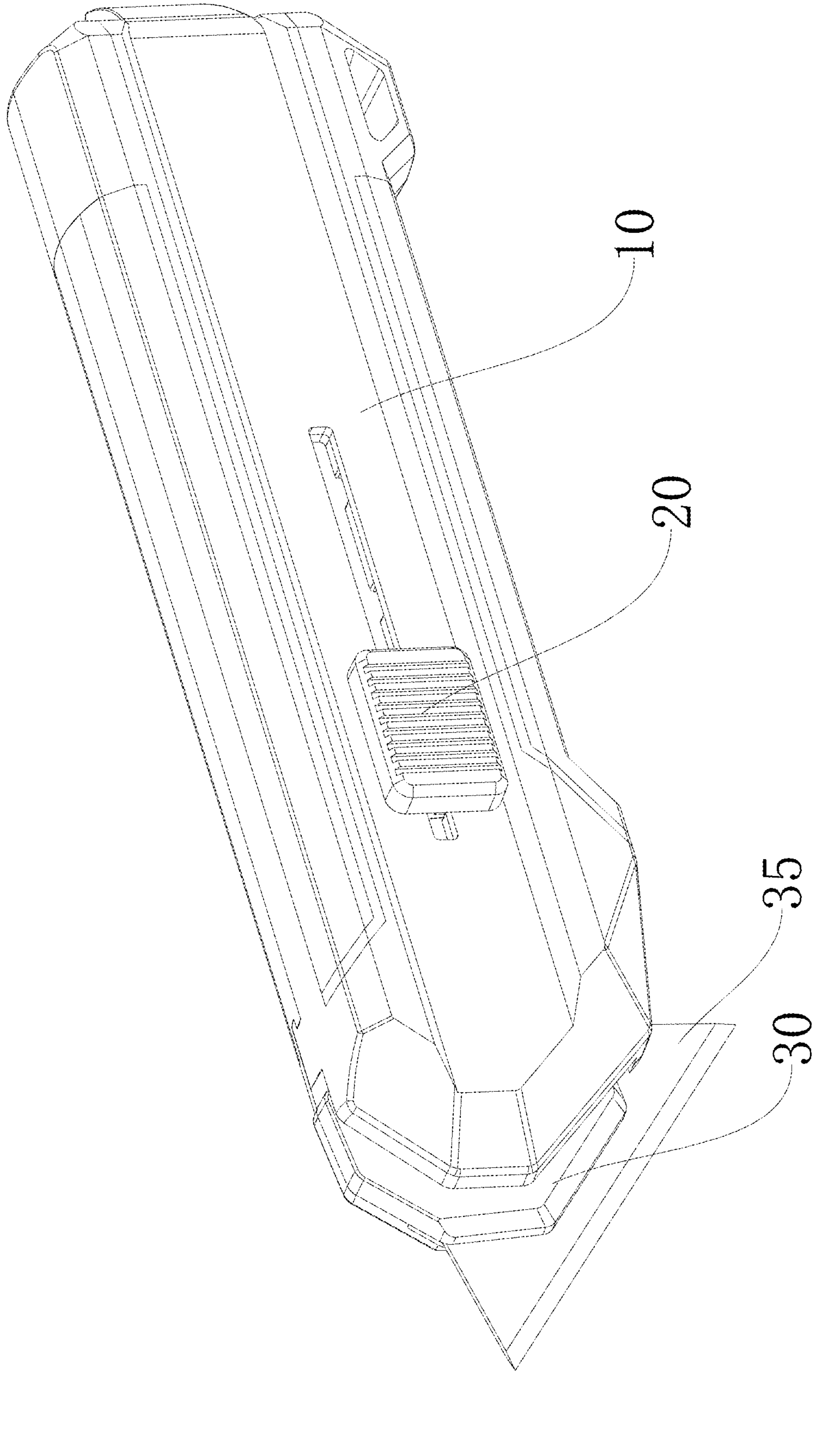
FIG. 7 is a schematic structural diagram of a multi-functional knife in a transitional position according to some embodiments of the present disclosure.

As shown in FIG. 6, the push button assembly 21 is pressed, so that the second connecting segment 2112 of the push button support 211 is separated from the positioning region 2212 of the positioning slot 221 of the positioning member 22, and the first connecting segment 2111 is engaged with the movement region 2211. As such, the push button assembly 21 can drive the drive member 23 to move forward along the first guide rail 222. The first guide member 311 of the blade holder 30 is hingedly connected to the first connecting hole 233 and also moves forward along the first guide rail 222, and the second guide member 321 of the blade holder 30 moves forward along the axial direction to a left part of the straight segment 1211 of the second guide rail 121, so that the blade holder 30 moves forward along the axial direction to the second longitudinal position. Then, the push button assembly 21 is released, the push button spring 212 causes the push button support 211 to move outward, the second connecting segment 2112 of the push button support 211 is engaged with the positioning region 2212 which is the third from the right, so that the blade holder 30 is locked in the second longitudinal position, and the triangular tip of the end of the blade 35 is exposed out of the housing 10, for use as a cutter knife.

Figure 8:
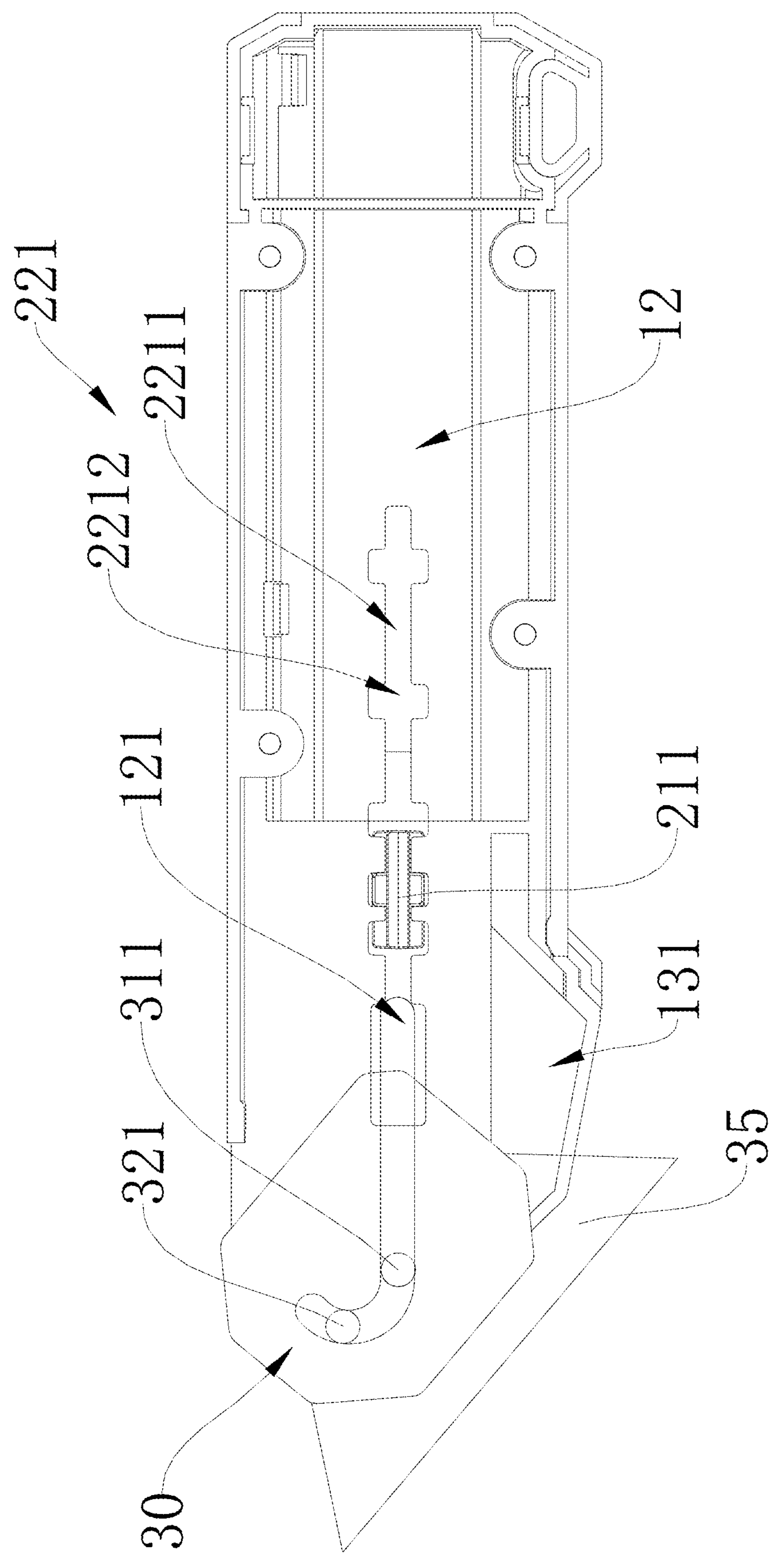
FIG. 8 is a schematic diagram of a multi-functional knife in a transitional position according to some embodiments of the present disclosure.
Figure 9:
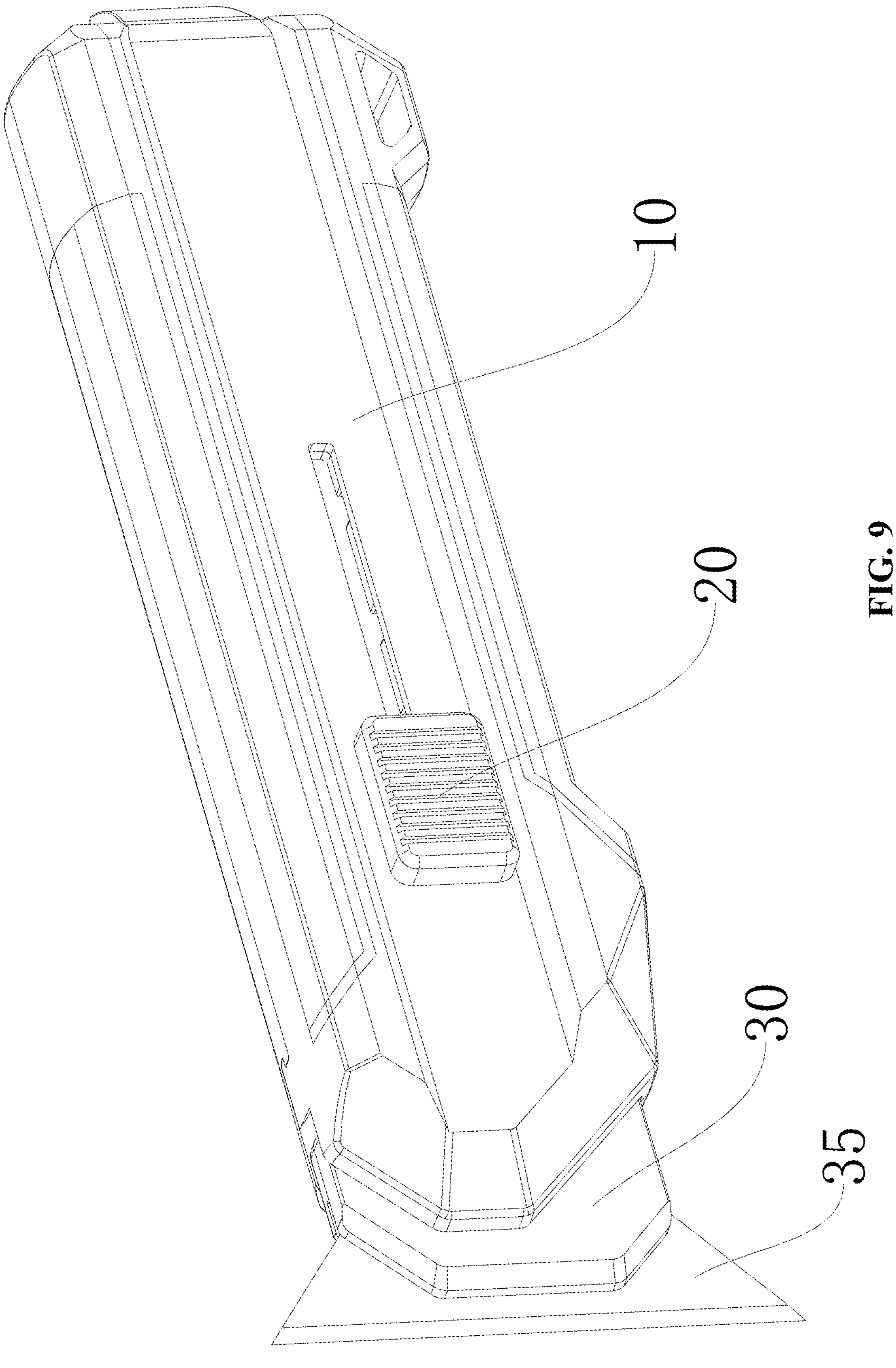
FIG. 9 is a schematic structural diagram of a multi-functional knife in a transverse position according to some embodiments of the present disclosure.

As shown in FIG. 8, the push button assembly 21 is pressed, so that the second connecting segment 2112 of the push button support 211 is separated from the positioning region 2212 of the positioning slot 221 of the positioning member 22, and the first connecting segment 2111 is engaged with the movement region 2211. As such, the push button assembly 21 can drive the drive member 23 to move forward along the first guide rail 222. The first guide member 311 of the blade holder 30 is hingedly connected to the first connecting hole 233 and also moves forward along the first guide rail 222, and the second guide member 321 of the blade holder 30 moves to a middle part of the main branch 1212 of the second guide rail 121, so that the blade holder 30 rotates counterclockwise to the transitional position while moving forward along the axial direction. Then, the push button assembly 21 is released, the push button spring 212 causes the push button support 211 to move outward, the second connecting segment 2112 of the push button support 211 is engaged with the positioning region 2212 which is the second from the left, so that the blade holder 30 is locked in the transitional position, and the blade edge of the blade 35 is completely exposed out of the housing 10 and forms an angle of 45° with the housing 10, for use as an oblique scraper knife. Further, the housing 10 is provided with an avoidance area 131. The avoidance area 131 is located at one side or two sides of the front end of the housing 10, the accommodating cavity 13 is in lateral communication with the outside through the avoidance area 131, and when the blade holder 30 rotates, the avoidance area 131 allows the blade holder 30 to rotate out of or into the accommodating cavity 13, to avoid interference between the blade 35 and the housing 10.

Figure 10:
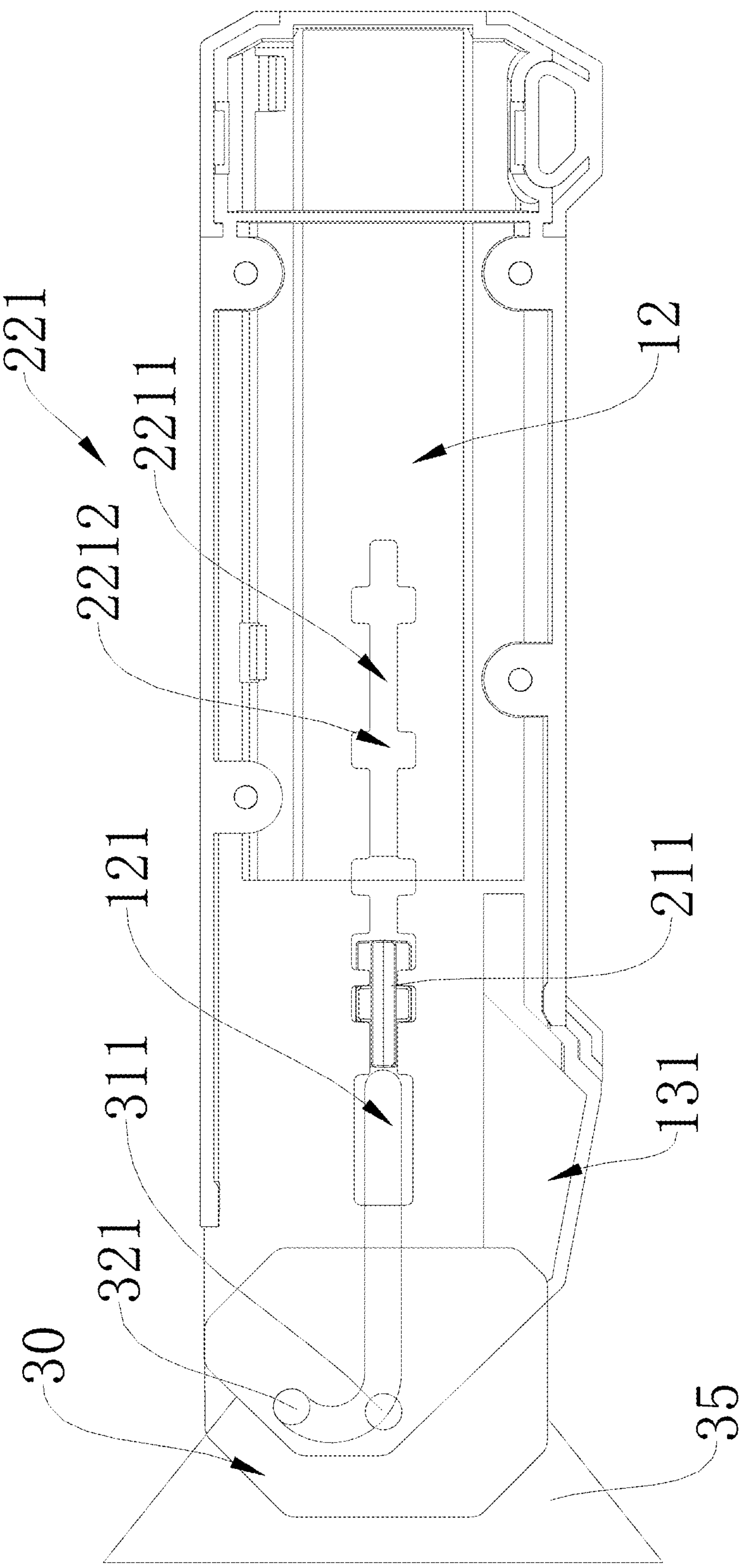
FIG. 10 is a schematic diagram of a multi-functional knife in a transverse position according to some embodiments of the present disclosure.

As shown in FIG. 10, the push button assembly 21 is pressed, so that the second connecting segment 2112 of the push button support 211 is separated from the positioning region 2212 of the positioning slot 221 of the positioning member 22, and the first connecting segment 2111 is engaged with the movement region 2211. As such, the push button assembly 21 can drive the drive member 23 to move forward along the first guide rail 222. The first guide member 311 of the blade holder 30 is hingedly connected to the first connecting hole 233 and also moves forward along the first guide rail 222, and the second guide member 321 of the blade holder 30 moves to an end part of the main branch 1212 of the second guide rail 121, so that the blade holder 30 rotates counterclockwise to the transverse position while moving forward along the axial direction. Then, the push button assembly 21 is released, the push button spring 212 causes the push button support 211 to move outward, the second connecting segment 2112 of the push button support 211 is engaged with the leftmost positioning region 2212, so that the blade holder 30 is locked in the transverse position, and the blade edge of the blade 35 is completely exposed out of the housing 10 and forms an angle of 90° with the housing 10, for use as a transverse scraper knife. It can be understood that by further extending the second guide rail 121, the blade holder 30 can continue to translate and/or rotate, so that the blade edge of the blade 35 forms an angle of 135°, or even 180°, or any other angle in the range of 90° to 180° with the housing 10.

Figure 16:
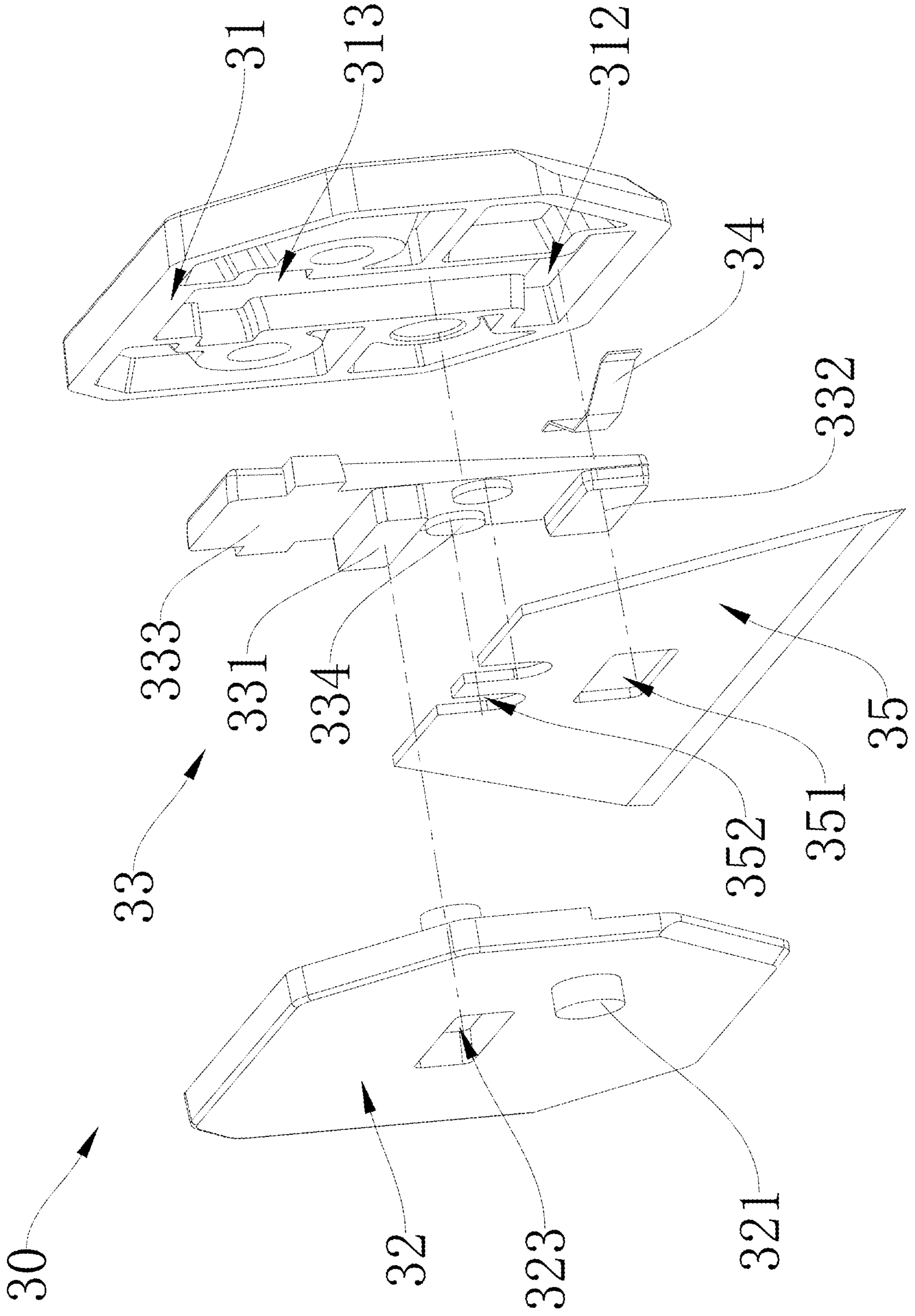
FIG. 16 is an exploded view of a blade holder according to some embodiments of the present disclosure.
Figure 17:
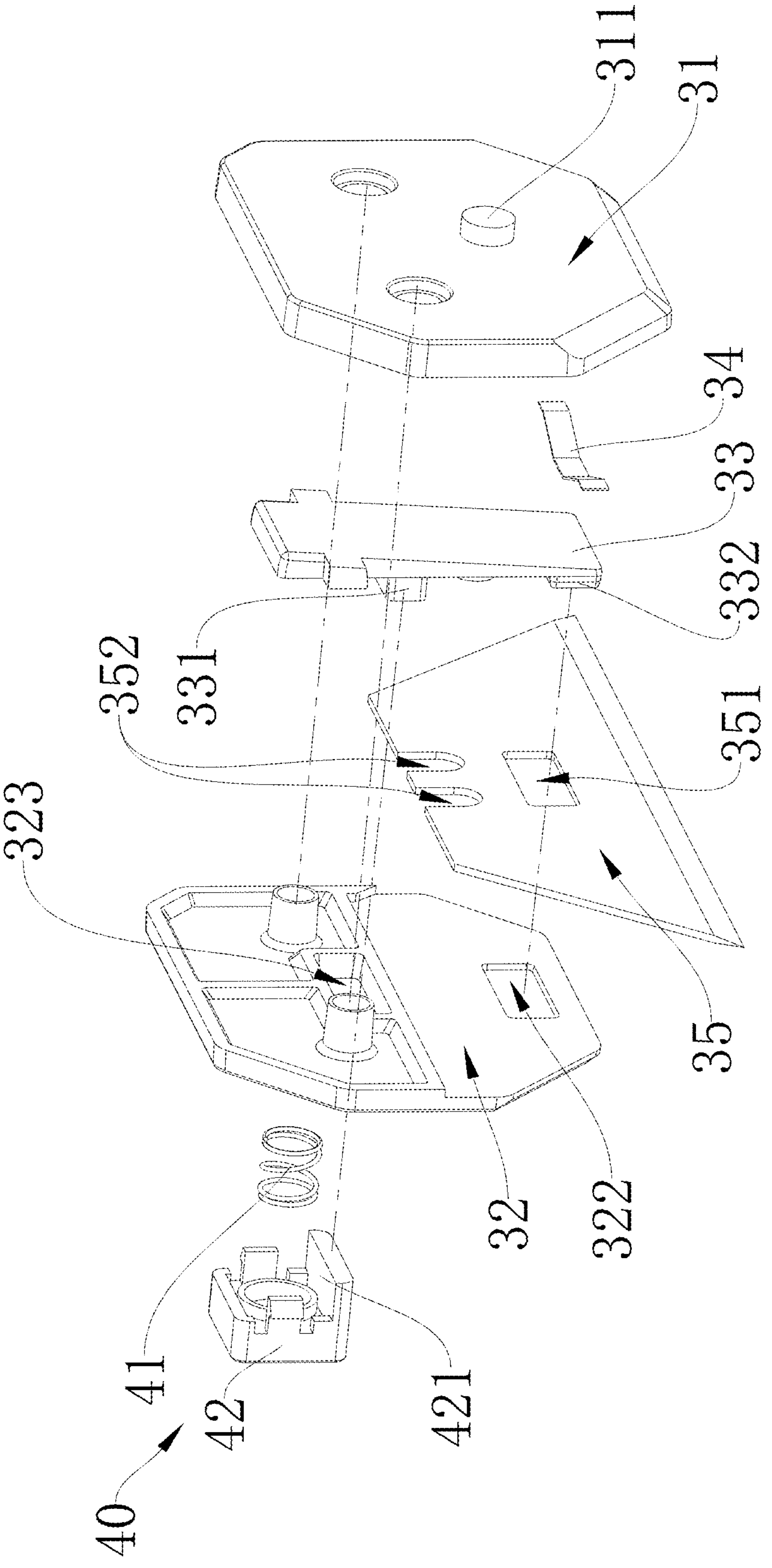
FIG. 17 is an exploded view of a blade holder according to some embodiments of the present disclosure.

In some embodiments, as shown in FIG. 16 and FIG. 17, the blade holder 30 includes a first frame 31, a middle frame 33, and a second frame 32. The middle frame 33 is elastically connected to the first frame 31 and the second frame 32. The first guide member 311 protrudes radially outward from the first frame 31, is pivotally connected to the first connecting hole 233 at the front end of the drive member 23, and is driven by the drive member 23 to move along the first guide rail 222. The second guide member 321 protrudes radially outward from the second frame 32 and is disposed eccentrically relative to the first guide member 311 and is connected to the second guide rail 121 of the lower housing 12. The blade 35 is detachably mounted between the second guide member 321 and the middle frame 33.

In some embodiments, as shown in FIG. 16 and FIG. 17, the blade holder 30 further includes an elastic piece 34, an elastic piece groove 312 for mounting the elastic piece 34 and a first mounting groove 313 for accommodating the middle frame 33 are provided on a side of the first frame 31 facing the second frame 32, and the elastic piece 34 is mounted between the first frame 31 and the middle frame 33 to provide an acting force for pressing the middle frame 33 against the second frame 32, so that the blade 35 is clamped between the middle frame 33 and the second frame 32.

Further, the blade 35 includes a limiting notch 352 and a mounting hole 351 extending through the blade 35, a main body 333 of the middle frame 33 is accommodated in the first mounting groove 313, a limiting portion 334 and a fixing portion 332 are arranged on and protrude from a side of the main body 333 facing the second frame 32, the limiting portion 334 is configured to engage with the limiting notch 352, the fixing portion 332 is configured to pass through the mounting hole 351 to fix the blade 35, a second mounting groove 322 is provided on a side of the second frame 32 facing the middle frame 33, and the second mounting groove 322 is configured to accommodate an end of the fixing portion 332.

In some embodiments, as shown in FIG. 11, the multi-functional knife further includes a blade change assembly 40 for changing the blade 35. The blade change assembly 40 includes a blade change button 42 and a return spring 41. The return spring 41 is configured so that the blade change button 42 is pressably arranged on the lower housing 12 of the housing. A protruding portion 421 is arranged on and protrudes from a side of the blade change button 42 facing the blade holder 30. The second frame 32 further includes a blade change hole 323 extending through the second frame 32. An extension portion 331 is arranged on and protrudes from the side of the main body 333 of the middle frame 33 facing the second frame 32. The extension portion 331 extends into the blade change hole 323. When the blade holder 30 is located in the second longitudinal position, the protruding portion 421 is aligned with the blade change hole 323 to press against the extension portion 331, and the blade change button 42 is pressed to cause the middle frame 33 to move toward the first frame 31, to separate the fixing portion 332 from the mounting hole 351 for replacing the blade 35.

Figure 5:
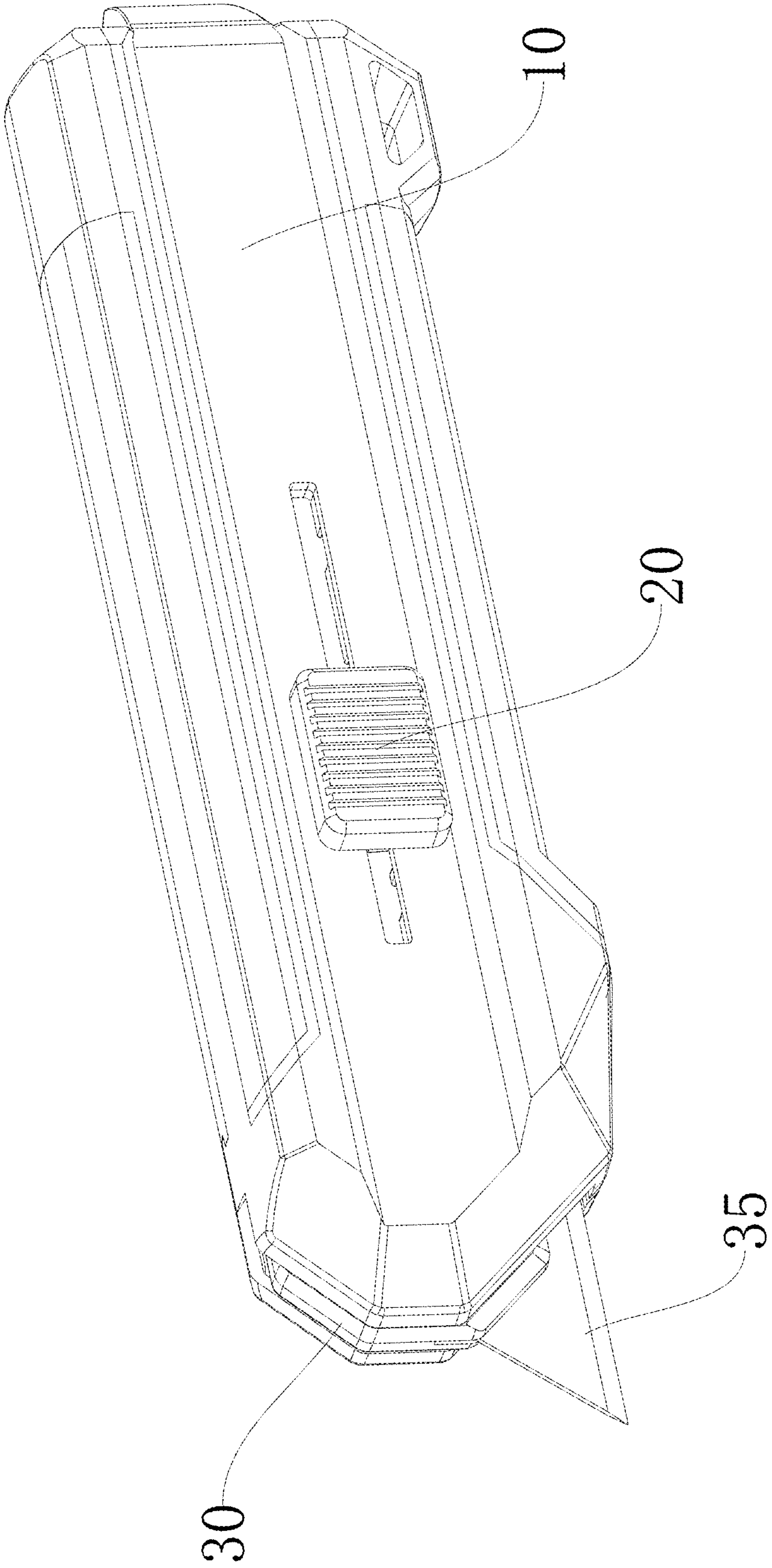
FIG. 5 is a schematic structural diagram of a multi-functional knife in a second longitudinal position according to some embodiments of the present disclosure.

Specifically, when the blade holder 30 moves to the position shown in FIG. 5 and FIG. 6, i.e., is in the second longitudinal position, the blade change hole 323 on the second frame 32 is exactly aligned with the protruding portion 421 of the blade change button 42. When the blade change button 42 is pressed, the protruding portion 421 passes through the blade change hole 323 and urges against the extension portion 331 of the middle frame 33 to push the middle frame 33 toward the first mounting groove 313 of the first frame 31, so that the fixing portion 332 of the middle frame 33 is detached from the second mounting groove 322 of the second frame 32, and further the fixing portion 332 is separated from the mounting hole 351 of the blade 35. As such, the blade 35 can be taken out. When the blade change button 42 is released, the return spring 41 pushes the blade change button 42 outward. Under the action of the elastic piece 34, the middle frame 33 urges against the second frame 32, and the fixing portion 332 of the middle frame 33 passes through the mounting hole 351 of the blade 35 and is inserted into the second mounting groove 322 of the second frame 32 to fix the blade 35. In other words, the blade 35 in the blade holder 30 can be quickly and safely replaced through the blade change button 42.

In some embodiments, a tail end of the housing 10 includes a curved hook portion 60 configured to pry an object such as a lid of a paint bucket.

The basic principles, main features and advantages of the present disclosure have been described above. Those skilled in the art should understand that the present disclosure is not limited to the above-mentioned embodiments. The descriptions of the embodiments and the specification are only for illustrating the principles of the present disclosure. Various changes and improvements may be made to the present disclosure without departing from the spirit and scope of the present disclosure, and such changes and improvements all fall within the scope of protection claimed by the present disclosure. The scope of protection claimed by the present disclosure is defined by the appended claims and equivalents thereof.

What is claimed is:

1. A multi-functional knife, comprising:

a housing, wherein the housing is provided with an accommodating cavity and an opening, and the opening is provided at a front end of the housing;

a blade holder, wherein the blade holder is configured to hold a blade, and is rotatably mounted in the accommodating cavity, and the blade holder comprises a first guide member and a second guide member, wherein the first guide member and the second guide member are respectively arranged on a front side and a rear side of the blade holder in a staggered manner;

a first guide assembly, wherein the first guide assembly comprises a first guide rail and a drive member, and the drive member is drivably connected to the front side of the blade holder, the drive member is provided with a driving surface, the driving surface is equipped with or directly serves as a sliding member, and the first guide member protrudes from the front side of the blade holder and is pivotally connected to a front end of the driving surface of the drive member to drive the blade holder to translate and/or rotate along the first guide rail; and a second guide assembly, wherein the second guide assembly comprises a fixed surface and a second guide rail, and the second guide member protrudes from the rear side of the blade holder and is pivotally connected to the second guide rail to drive the blade holder to translate and/or rotate along the second guide rail, so that a longitudinal driving force applied by the drive member to the first guide member is converted to a force for turning the blade holder to a plurality of positioning angles;

wherein the first guide rail and the second guide rail are each of a linear structure and/or an arc-shaped structure, an extending direction of the first guide rail is at least partially different from an extending direction of the second guide rail, the second guide rail comprises a main branch, the main branch extends outward in a direction deviating from the first guide rail so that the blade holder is connected to the fixed surface and the driving surface in at least two partially different directions, and when the drive member is longitudinally moved along an axial direction relative to the fixed surface, the blade holder is gradually turned under acting forces from the fixed surface and the driving surface, so that the blade holder is gradually rotated out of or back into the accommodating cavity through the opening, and an orientation of the blade holder is changed to a plurality of positioning angles between a longitudinal position and a transverse position alternately.

2. The multi-functional knife according to claim 1, wherein the housing comprises an upper housing and a lower housing, the drive member is located in the accommodating cavity between the upper housing and the blade holder, the upper housing is provided with a push button groove, the push button groove is elongated and extends along the axial direction, the fixed surface is located on an inner surface of the lower housing, and the second guide rail is formed on the inner surface of the lower housing; the second guide rail further comprises a straight segment, the main branch and the straight segment are in integral communication with each other, the main branch extends outward in an arc-shaped or bent configuration along a direction deviating from the straight segment, and an extending direction of the straight segment is identical to the extending direction of the first guide rail; when the blade holder moves linearly along the straight segment of the second guide rail and the first guide rail, the blade on the blade holder is in a state of retracting into the accommodating cavity or in a state of extending out of the opening; and when the blade holder turns and moves along the main branch of the second guide rail and the first guide rail, an orientation of the blade on the blade holder is changed to the plurality of positioning angles between the longitudinal position and the transverse position alternately.

3. The multi-functional knife according to claim 2, further comprising a movement assembly, wherein the movement assembly comprises a push button assembly and a positioning member, the positioning member is arranged between the push button assembly and the drive member, the positioning member comprises a positioning slot and the first guide rail, the positioning slot is formed on a surface of the positioning member, the first guide rail is formed on a rear side of the positioning member, the positioning slot is in communication with an outside through the push button groove, a lower end of the push button assembly passes through the push button groove and the positioning slot and is connected to the drive member to push the drive member to move axially along the first guide rail, and the push button assembly is configured to be elastically locked in the positioning slot to lock the blade on the blade holder in the longitudinal position, the transverse position, or a transitional position between the longitudinal position and the transverse position.

4. The multi-functional knife according to claim 3, further comprising an anti-rotation member, wherein the anti-rotation member is rotatably connected to the drive member, a first end of the anti-rotation member is movably connected to the push button assembly, a stop portion is arranged on and protrudes from a side of a second end of the anti-rotation member facing the blade holder, a plurality of stopping grooves configured to accommodate the stop portion are provided on the front side of the blade holder, and a rotation of the anti-rotation member under an action of the push button assembly causes the stop portion to be elastically locked in a stopping groove of the plurality of stopping grooves.

5. The multi-functional knife according to claim 3, wherein the housing is provided with an avoidance area, the avoidance area is located at one side or two sides of the front end of the housing, the accommodating cavity is in lateral communication with an outside through the avoidance area, and when the blade holder rotates, the avoidance area allows the blade holder to rotate out of or into the accommodating cavity.

6. The multi-functional knife according to claim 5, wherein the blade holder comprises a first frame, a middle frame, and a second frame, the middle frame is elastically connected to the first frame and the second frame, the first guide member protrudes radially outward from the first frame, the second guide member protrudes radially outward from the second frame and is disposed eccentrically relative to the first guide member, and the blade is detachably mounted between the second guide member and the middle frame.

7. The multi-functional knife according to claim 6, wherein the straight segment of the second guide rail overlaps with the first guide rail in a direction perpendicular to the axial direction, and the main branch of the second guide rail extends radially outward in an arc-shaped configuration from a front end of the straight segment, so that the blade holder is moved to a retracted position, a first longitudinal position, a second longitudinal position, a transitional position, and the transverse position along the second guide rail; when the second guide member is located at a starting end of the straight segment of the second guide rail, the blade holder is longitudinally in the retracted position, and the blade is retracted into the accommodating cavity; when the second guide member moves forward along the straight segment of the second guide rail, the blade holder is sequentially in the first longitudinal position where the blade partially extends out of the opening and the second longitudinal position where the blade completely extends out of the opening; when the second guide member moves from the straight segment to the main branch, the blade holder is turned to the transitional position, and the blade is rotated out of the accommodating cavity by a turning angle of 0° to 90° or 90° to 180°, so that the blade enters an oblique state to serve as an oblique scraper knife; and when the second guide member moves to an end of the main branch, the blade holder is rotated to the transverse position, and the blade enters a transverse state to serve as a transverse scraper knife.

8. The multi-functional knife according to claim 7, wherein the blade holder further comprises an elastic piece, an elastic piece groove for mounting the elastic piece and a first mounting groove for accommodating the middle frame are provided on a side of the first frame facing the second frame, and the elastic piece is configured to provide an acting force for pressing the middle frame against the second frame, so that the blade is clamped between the middle frame and the second frame;

the blade comprises a limiting notch and a mounting hole, the limiting notch and the mounting hole extend through the blade, a main body of the middle frame is accommodated in the first mounting groove, a limiting portion and a fixing portion are arranged on and protrude from a side of the main body facing the second frame, the limiting portion is configured to engage with the limiting notch, the fixing portion is configured to pass through the mounting hole to fix the blade, a second mounting groove is provided on a side of the second frame facing the middle frame, and the second mounting groove is configured to accommodate an end of the fixing portion;

the multi-functional knife further comprises a blade change assembly for changing the blade, wherein the blade change assembly comprises a blade change button and a return spring, the return spring is configured so that the blade change button is pressably arranged on the lower housing of the housing, and a protruding portion is arranged on and protrudes from a side of the blade change button facing the blade holder; the second frame further comprises a blade change hole extending through the second frame, an extension portion is arranged on and protrudes from the side of the main body of the middle frame facing the second frame, the extension portion extends into the blade change hole, and when the blade holder is located in the second longitudinal position, the protruding portion is aligned with the blade change hole to press against the extension portion, and the blade change button is pressed to cause the middle frame to move toward the first frame, to separate the fixing portion from the mounting hole for replacing the blade;

the push button assembly comprises a push button support and a push button spring, the push button support passes through the push button groove and the positioning slot and is connected to the drive member, a first end of the push button spring presses against the push button support, and a second end of the push button spring presses against the drive member, so that the push button support is movably locked in the positioning slot; a push button panel is fixedly connected to an end of the push button support extending out of an outer side of the upper housing of the housing, to push the push button support to cause the drive member to move along the first guide rail;

the push button support comprises a first connecting segment and a second connecting segment distributed perpendicularly to the driving surface, the positioning slot comprises a movement region and a plurality of positioning regions, the movement region is elongated and extends along the axial direction and the plurality of positioning regions are distributed at intervals, the first connecting segment passes through the push button groove on the upper housing and is configured to move along the movement region of the positioning slot, and the second connecting segment is fixedly connected to the drive member and is configured to engage with a positioning region of the plurality of positioning regions to lock the drive member;

the drive member comprises an engaging portion, a first connecting hole, and a second connecting hole, the engaging portion is configured to engage with the first guide rail so that the drive member moves along the first guide rail, the first connecting hole is configured to be connected to the first guide member on the first frame, the second connecting hole is configured to be connected to the second connecting segment of the push button support, and when the push button assembly is pushed, the blade holder is pushed to move by the drive member; and a tail end of the housing comprises a curved hook portion configured to pry an object.

9. The multi-functional knife according to claim 4, wherein the housing is provided with an avoidance area, the avoidance area is located at one side or two sides of the front end of the housing, the accommodating cavity is in lateral communication with an outside through the avoidance area, and when the blade holder rotates, the avoidance area allows the blade holder to rotate out of or into the accommodating cavity.

10. The multi-functional knife according to claim 9, wherein the blade holder comprises a first frame, a middle frame, and a second frame, the middle frame is elastically connected to the first frame and the second frame, the first guide member protrudes radially outward from the first frame, the second guide member protrudes radially outward from the second frame and is disposed eccentrically relative to the first guide member, and the blade is detachably mounted between the second guide member and the middle frame.

11. The multi-functional knife according to claim 10, wherein the straight segment of the second guide rail overlaps with the first guide rail in a direction perpendicular to the axial direction, and the main branch of the second guide rail extends radially outward in an arc-shaped configuration from a front end of the straight segment, so that the blade holder is moved to a retracted position, a first longitudinal position, a second longitudinal position, a transitional position, and the transverse position along the second guide rail; when the second guide member is located at a starting end of the straight segment of the second guide rail, the blade holder is longitudinally in the retracted position, and the blade is retracted into the accommodating cavity; when the second guide member moves forward along the straight segment of the second guide rail, the blade holder is sequentially in the first longitudinal position where the blade partially extends out of the opening and the second longitudinal position where the blade completely extends out of the opening; when the second guide member moves from the straight segment to the main branch, the blade holder is turned to the transitional position, and the blade is rotated out of the accommodating cavity by a turning angle of 0° to 90° or 90° to 180°, so that the blade enters an oblique state to serve as an oblique scraper knife; and when the second guide member moves to an end of the main branch, the blade holder is rotated to the transverse position, and the blade enters a transverse state to serve as a transverse scraper knife.

12. The multi-functional knife according to claim 11, wherein the blade holder further comprises an elastic piece, an elastic piece groove for mounting the elastic piece and a first mounting groove for accommodating the middle frame are provided on a side of the first frame facing the second frame, and the elastic piece is configured to provide an acting force for pressing the middle frame against the second frame, so that the blade is clamped between the middle frame and the second frame;

the blade comprises a limiting notch and a mounting hole, the limiting notch and the mounting hole extend through the blade, a main body of the middle frame is accommodated in the first mounting groove, a limiting portion and a fixing portion are arranged on and protrude from a side of the main body facing the second frame, the limiting portion is configured to engage with the limiting notch, the fixing portion is configured to pass through the mounting hole to fix the blade, a second mounting groove is provided on a side of the second frame facing the middle frame, and the second mounting groove is configured to accommodate an end of the fixing portion;

the multi-functional knife further comprises a blade change assembly for changing the blade, wherein the blade change assembly comprises a blade change button and a return spring, the return spring is configured so that the blade change button is pressably arranged on the lower housing of the housing, and a protruding portion is arranged on and protrudes from a side of the blade change button facing the blade holder; the second frame further comprises a blade change hole extending through the second frame, an extension portion is arranged on and protrudes from the side of the main body of the middle frame facing the second frame, the extension portion extends into the blade change hole, and when the blade holder is located in the second longitudinal position, the protruding portion is aligned with the blade change hole to press against the extension portion, and the blade change button is pressed to cause the middle frame to move toward the first frame, to separate the fixing portion from the mounting hole for replacing the blade;

the push button assembly comprises a push button support and a push button spring, the push button support passes through the push button groove and the positioning slot and is connected to the drive member, a first end of the push button spring presses against the push button support, and a second end of the push button spring presses against the drive member, so that the push button support is movably locked in the positioning slot; a push button panel is fixedly connected to an end of the push button support extending out of an outer side of the upper housing of the housing, to push the push button support to cause the drive member to move along the first guide rail;

the push button support comprises a first connecting segment and a second connecting segment distributed perpendicularly to the driving surface, the positioning slot comprises a movement region and a plurality of positioning regions, the movement region is elongated and extends along the axial direction and the plurality of positioning regions are distributed at intervals, the first connecting segment passes through the push button groove on the upper housing and is configured to move along the movement region of the positioning slot, and the second connecting segment is fixedly connected to the drive member and is configured to engage with a positioning region of the plurality of positioning regions to lock the drive member;

the drive member comprises an engaging portion, a first connecting hole, and a second connecting hole, the engaging portion is configured to engage with the first guide rail so that the drive member moves along the first guide rail, the first connecting hole is configured to be connected to the first guide member on the first frame, the second connecting hole is configured to be connected to the second connecting segment of the push button support, and when the push button assembly is pushed, the blade holder is pushed to move by the drive member; and a tail end of the housing comprises a curved hook portion configured to pry an object.

* * * * *